(12) United States Patent
Watakabe et al.

(10) Patent No.: US 12,287,552 B2
(45) Date of Patent: Apr. 29, 2025

(54) DISPLAY DEVICE

(71) Applicant: Japan Display Inc., Tokyo (JP)

(72) Inventors: Hajime Watakabe, Tokyo (JP);
Masashi Tsubuku, Tokyo (JP);
Toshinari Sasaki, Tokyo (JP); Takaya Tamaru, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/508,246

(22) Filed: Nov. 14, 2023

(65) Prior Publication Data

US 2024/0176196 A1 May 30, 2024

(30) Foreign Application Priority Data

Nov. 24, 2022 (JP) .................................. 2022-187757

(51) Int. Cl.
*G02F 1/1362* (2006.01)
*G02F 1/1368* (2006.01)
*G06F 3/044* (2006.01)

(52) U.S. Cl.
CPC .. *G02F 1/136227* (2013.01); *G02F 1/136286* (2013.01); *G02F 1/13685* (2021.01); *G06F 3/044* (2013.01)

(58) Field of Classification Search
CPC .................................................. G02F 1/1362
See application file for complete search history.

(56) References Cited

U.S. PATENT DOCUMENTS

| 2005/0208713 | A1* | 9/2005 | Ohnishi | G02F 1/1337 438/166 |
| 2013/0020571 | A1* | 1/2013 | Yamazaki | H01L 29/78618 257/43 |
| 2013/0140559 | A1* | 6/2013 | Yamazaki | G02F 1/136277 257/43 |
| 2014/0346502 | A1* | 11/2014 | Matsukizono | H01L 29/66969 257/43 |
| 2016/0048267 | A1 | 2/2016 | Lee et al. | |
| 2016/0342255 | A1* | 11/2016 | Noguchi | G02F 1/134363 |
| 2017/0229666 | A1* | 8/2017 | Tsuruoka | H10K 59/8723 |
| 2018/0097106 | A1* | 4/2018 | Zhu | H01L 29/66431 |
| 2018/0217458 | A1* | 8/2018 | Xie | G02F 1/136209 |
| 2018/0301472 | A1* | 10/2018 | Matsukizono | H10K 59/10 |
| 2019/0043978 | A1* | 2/2019 | Makabe | H01L 29/66462 |
| 2019/0155119 | A1* | 5/2019 | Matsukizono | G02F 1/136209 |

FOREIGN PATENT DOCUMENTS

| CN | 103456747 | * 12/2013 | ........... G02F 1/1362 |
| JP | 2016-042184 A | 3/2016 | |

* cited by examiner

*Primary Examiner* — Sang V Nguyen
(74) *Attorney, Agent, or Firm* — XSENSUS LLP

(57) ABSTRACT

A display device includes a plurality of pixel electrodes each connected to a semiconductor device, a plurality of common electrodes each disposed opposite to a part of the plurality of pixel electrodes, and a plurality of common wirings each connected to the plurality of common electrodes. The semiconductor device includes an oxide semiconductor layer having a polycrystalline structure, and at least a part of each common wiring is composed of the oxide semiconductor layer. Each common electrode may be located across a plurality of pixel electrodes.

10 Claims, 31 Drawing Sheets

DISPLAY DEVICE

CROSS-REFERENCE TO RELATED APPLICATION

This application claims the benefit of priority to Japanese Patent Application No. 2022-187757, filed on Nov. 24, 2022, the entire contents of which are incorporated herein by reference.

FIELD

One embodiment of the invention relates to a display device.

BACKGROUND

Conventionally, a display device with a touch sensor in which a touch sensor is arranged over a display portion is known. The touch sensor is a sensor that detects a position of a finger or the like touching the display portion, and for example, there are various types of touch sensors such as a resistance film type and a capacitance type. In particular, the capacitive type has an advantage that touch detection at a plurality of locations is possible, and is widely used. The capacitance type is further classified into a self-capacitance type and a mutual capacitance type. In particular, a display device with the self-capacitance type touch sensor has an advantage that the number of electrodes used as the touch sensor is smaller than that of the mutual capacitance type touch sensor, and a structure of the entire display device is simplified (for example, see Japanese laid-open patent publication No. 2016-42184).

SUMMARY

A display device in one embodiment of the invention includes a plurality of pixel electrodes each connected to a semiconductor device, a plurality of common electrodes each disposed opposite to a part of the plurality of pixel electrodes, and a plurality of common wirings each connected to the plurality of common electrodes. The semiconductor device includes an oxide semiconductor layer having a polycrystalline structure, and at least a part of each common wiring is composed of the oxide semiconductor layer.

DESCRIPTION OF EMBODIMENTS

Figure 1:
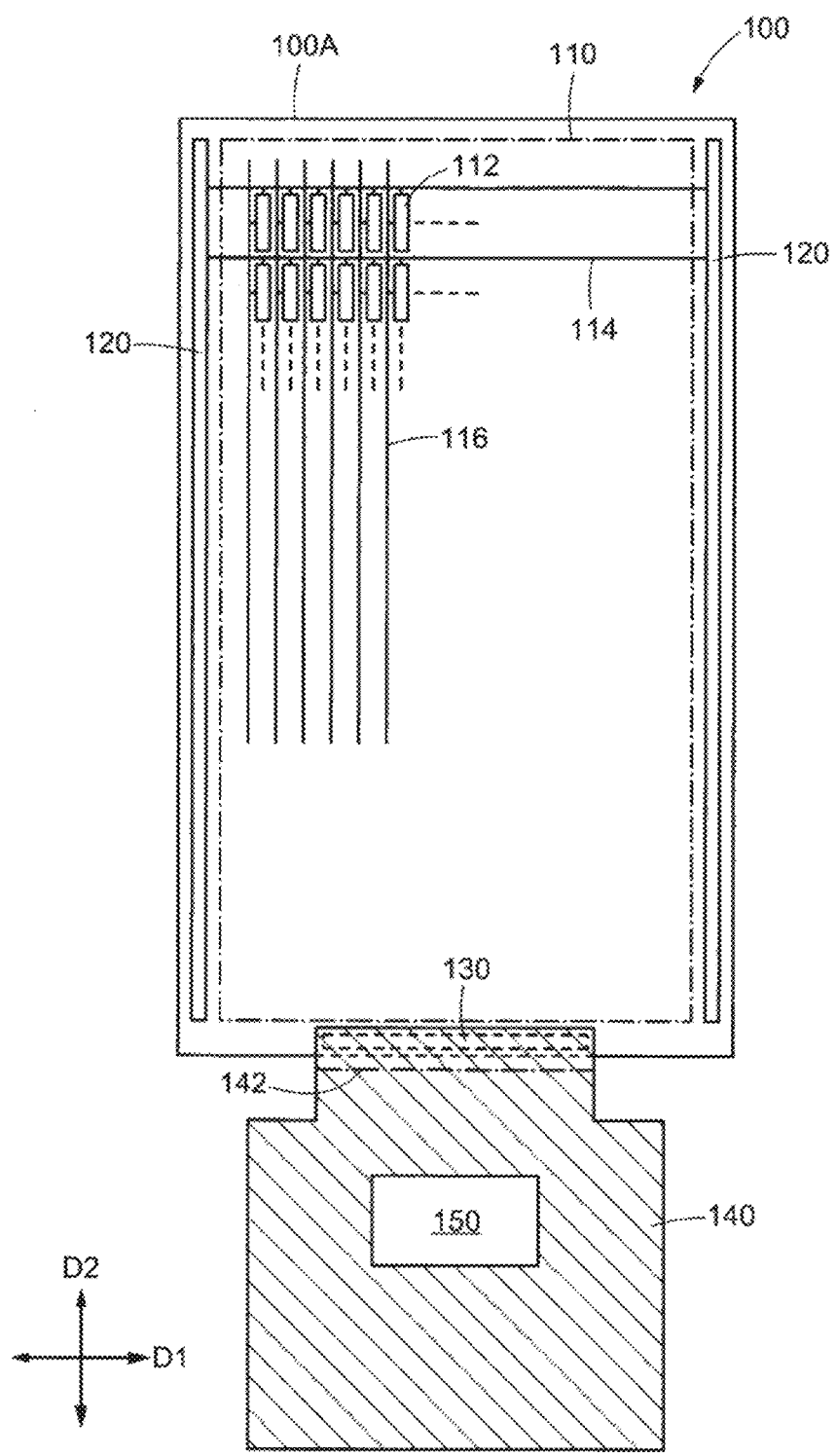
FIG. 1 is a plan view showing a configuration of a display device according to an embodiment of the present invention.

In a self-capacitance type touch sensor, detection electrodes need to be electrically connected with a common wiring in order to apply a control voltage (for example, a ground voltage) to a plurality of detection electrodes used for touch detection. Therefore, a plurality of detection electrodes is arranged in the display portion of the display device including the self-capacitance type touch sensor, and a plurality of common wirings is arranged in order to electrically connect these detection electrodes. Since the plurality of common wirings is generally composed of metal materials, an aperture ratio of the display portion (a ratio of a region available as a pixel to the area of the display portion) may be reduced.

An object of an embodiment of the present invention is to provide a display device in which the aperture ratio of the display portion is improved with a simple structure.

Hereinafter, each embodiment of the present invention will be described with reference to the drawings. The following disclosure is merely an example. A configuration that can be easily conceived by a person skilled in the art by appropriately changing the configuration of the embodiment while keeping the gist of the invention is naturally included in the scope of the present invention. In order to make the description clearer, the drawings may schematically show the width, thickness, shape, and the like of each part in comparison with an actual embodiment. However, the illustrated shapes are merely examples, and do not limit the interpretation of the present invention. In the present specification and the drawings, the same reference signs are given to elements similar to those described above with respect to the above-described drawings, and detailed description thereof may be omitted as appropriate.

In each embodiment, a direction from a substrate to an oxide semiconductor layer is referred to as "on" or "above". Conversely, a direction from the oxide semiconductor layer to the substrate is referred to as "under" or "below". In this way, for convenience of explanation, the phrase "above" or "below" is used to describe, but for example, the upper and lower relations between the substrate and the oxide semiconductor layer may be arranged so as to be opposite to those shown in the drawings. In the following explanation, for example, the expression "an oxide semiconductor layer on a substrate" merely describes the upper and lower relationship between the substrate and the oxide semiconductor layer as described above, and another member may be arranged between the substrate and the oxide semiconductor layer. The upper and lower refer to the stacking order in a structure in which a plurality of layers is stacked, and when expressed as "a pixel electrode above a transistor" may be a positional relationship in which the transistor and the pixel electrode do not overlap each other in a plan view. On the other hand, the expression "a pixel electrode vertically above a transistor" means a positional relationship in which the transistor and the pixel electrode overlap each other in a plan view.

In each embodiment, a plurality of elements formed by performing processing such as etching on one film may be described as elements having different functions or roles. These elements are composed of the same layer structure and the same material and are described as elements composed of the same layer.

In each embodiment, a "display device" refers to a device that displays an image using an electro-optic layer. For example, the term "display device" includes not only a display panel including the electro-optic layer, but also a device with other optical members (for example, polarizing members or backlights and the like) attached to the display panel. The "electro-optic layer" may include a liquid crystal layer, an electroluminescent (EL) layer, an electrochromic (EC) layer, and an electrophoretic layer, as long as there is no technical contradiction. In the embodiments described below, although a liquid crystal display device including the liquid crystal layer will be exemplified, the present invention can also be applied to a display device including the other electro-optic layers described above.

In each embodiment, the expressions "α includes A, B, or C," "α includes any of A, B, or C," and "α includes one selected from a group consisting of A, B, and C" do not exclude the case where a includes a plurality of combinations of A to C unless otherwise indicated. Furthermore, these expressions do not exclude the case where a includes other elements.

First Embodiment

[Configuration of Display Device]

A display device 100 according to an embodiment of the present invention will be described. In the present embodiment, the display device 100 is the liquid crystal display device including the liquid crystal layer as an electro-optic layer. More specifically, the display device 100 is the liquid crystal display device with a touch sensor function. Specifically, the display device 100 includes a self-capacitance type touch sensor.

FIG. 1 is a plan view showing a configuration of the display device 100 according to an embodiment of the present invention. As shown in FIG. 1, a display portion 110, a scanning-side drive portion 120, and a terminal portion 130 are arranged on a surface side of a circuit substrate 100A of the display device 100.

The circuit substrate 100A is a substrate in which a plurality of semiconductor devices formed using an oxide semiconductor is arranged on a support substrate having light transmittance. In the present embodiment, although an example in which a thin film transistor is arranged as a semiconductor device is shown, the present invention is not limited to this example, and other semiconductor devices may be arranged as long as the devices function as switching elements. The circuit substrate 100A may also be referred to as an active matrix substrate. A substrate having light transmittance can be used as the support substrate constituting the circuit substrate 100A. For example, a glass substrate or a substrate having flexibility is preferably used as the support substrate.

The display portion 110 is a portion for controlling a plurality of pixels 112 that displays an image. Specifically, the display portion 110 includes a plurality of scanning signal lines 114 extending in a direction D1 (row direction) and a plurality of video signal lines 116 extending in a direction D2 (column direction), and includes the pixel 112 including the semiconductor device, such as a thin film transistor, corresponding to each of intersections of the plurality of scanning signal lines 114 and the plurality of video signal lines 116. In the present embodiment, the individual pixels 112 are sub-pixels corresponding to any of the colors R (red), G (green), and B (blue). Therefore, in practice, color display is performed using one pixel (main pixel) as a unit, which includes three pixels 112 corresponding to each color of RGB.

In this case, a pixel circuit 200 for controlling the light emission of each pixel 112 will be described with reference to FIG. 2. For convenience of explanation, although a basic configuration using one semiconductor device (thin film transistor) and one holding capacity will be described as an example, the configuration of the pixel circuit 200 is not limited to this example.

Figure 2:
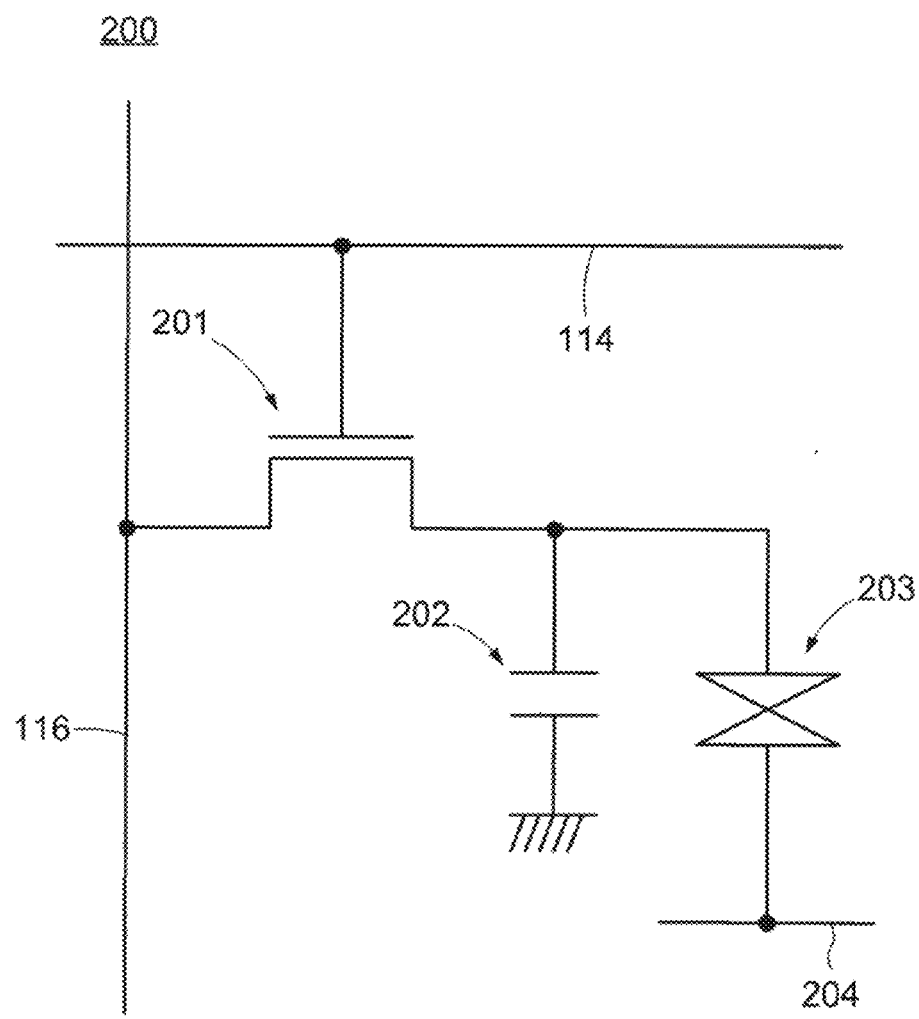
FIG. 2 is a diagram showing a configuration of a pixel circuit in a display device according to an embodiment of the present invention.

FIG. 2 is a diagram showing a configuration of the pixel circuit 200 in the display device 100 according to an embodiment of the present invention. As shown in FIG. 2, the pixel circuit 200 includes a select transistor 201, a holding capacity 202, and a liquid crystal element 203. As will be described later, the select transistor 201 is a thin film transistor including a channel portion composed of the oxide semiconductor layer.

A gate of the select transistor 201 is connected to the scanning signal line 114. A source of the select transistor 201 is connected to the video signal line 116. A gradation signal that determines the amount of light transmitted through the liquid crystal element 203 is supplied to the video signal line 116. A scan signal for selecting a pixel to which the gradation signal is written is supplied to the scanning signal line 114. A drain of the select transistor 201 is connected to the holding capacity 202 and the liquid crystal element 203. The source and drain of the select transistor 201 may be switched depending on the magnitude of a voltage applied to the video signal line 116 and a voltage stored in the holding capacity 202.

The holding capacity 202 is a capacitor that holds the voltage input from the video signal line 116 via the select transistor 201. One electrode of the holding capacitor 202 is connected to the drain of the select transistor 201, and the other electrode is fixed to the ground potential. However, the present invention is not limited to this example, and the other electrode may be fixed to another potential.

The liquid crystal element 203 is an electro-optical element having a configuration in which the liquid crystal layer is arranged between a pair of electrodes. Although a specific structure will be described later, the liquid crystal element 203 of the present embodiment includes a pixel electrode connected to the drain of the select transistor 201 and a common electrode connected to a common wiring 204, and the orientation of liquid crystal molecules is controlled by an electric field formed between the pixel electrode and the common electrode. In the present embodiment, the common electrode connected to the common wiring 204 functions as an electrode for applying a voltage to the liquid crystal layer and a detection electrode of the touch sensor. This point will be described later.

The above-described pixel circuit 200 is arranged in each pixel 112 of the display device 100. In other words, it can be said that the display portion 110 shown in FIG. 1 is composed of an aggregate of the pixel circuit 200.

The description is returned to FIG. 1. The scanning-side drive portion 120 is coupled to the scanning signal line 114 and transmits the scan signal to the scanning signal line 114. Specifically, the scan signal is applied to the gate of the select transistor 201 shown in FIG. 2 and used for switching control of the select transistor 201. In the present embodiment, like the pixel circuit 200 included in the plurality of pixels 112, a drive circuit constituting the scanning-side drive portion 120 is also formed using a thin film transistor but may be replaced with an IC chip or the like. In addition, in the present embodiment, although two scanning-side drive portions 120 are arranged on the circuit substrate 100A with the display portion 110 interposed therebetween, only one of the scanning-side drive portions 120 may be arranged.

The terminal portion 130 is a portion for electrically connecting various wirings arranged in the circuit substrate 100A to a flexible printed circuit substrate 140. Specifically, the terminal portion 130 is an aggregate of the plurality of terminals connected to the plurality of video signal lines 116, a wiring (not shown) for supplying a control signal to the scanning-side drive portion 120, and the common wiring 204 (see FIG. 2). The terminal portion 130 is arranged outside the display portion 110. The video signal and the control signal supplied from the outside are respectively supplied to the display portion 110 and the scanning-side drive portion 120 via the terminal portion 130. In addition, the touch sensor function of the display device 100 is realized by processing a detection signal output to the outside via the common wiring 204.

The flexible printed circuit substrate 140 is connected to the terminal portion 130. The flexible printed circuit substrate 140 is an interface substrate for connecting the circuit substrate 100A and an external control circuit (not shown). In the present embodiment, a display control circuit 150 is mounted on the flexible printed circuit substrate 140. The display control circuit 150 is a signal processing circuit that executes signal processing of the video signal to be supplied to the display portion 110 and various control signals to be supplied to the scanning-side drive portion 120.

In the present embodiment, the display control circuit 150 also functions as a touch sensor circuit that detects a touch position based on the detection signal acquired via the common wiring 204. However, the present invention is not limited to this example, and the functions related to the display control and the functions related to the touch sensor may be provided separately in individual control circuits. In the present embodiment, the display control circuit 150 is mounted on the flexible printed circuit substrate 140 in the form of an IC tip.

Since the flexible printed circuit substrate 140 is a circuit substrate in which a wiring is printed on a flexible substrate composed of a resin material, it can be folded. In the present embodiment, the flexible printed circuit substrate 140 may be folded by a folding line 142 indicated by a dash-dot line so that the flexible printed circuit substrate 140 and a back surface side of the circuit substrate 100A (the side on which the display portion 110 or the like is not formed) overlap.

Next, the touch sensor will be described. The display device 100 of the present embodiment includes a self-capacitance type touch sensor. However, the type of the touch sensor is not limited to the self-capacitance type. The present invention can be applied to any display device as long as it is a display device in which the wiring for supplying the signal to the detection electrode constituting the touch sensor or the wiring for outputting the signal from the detection electrode is arranged in the display portion.

Figure 3:
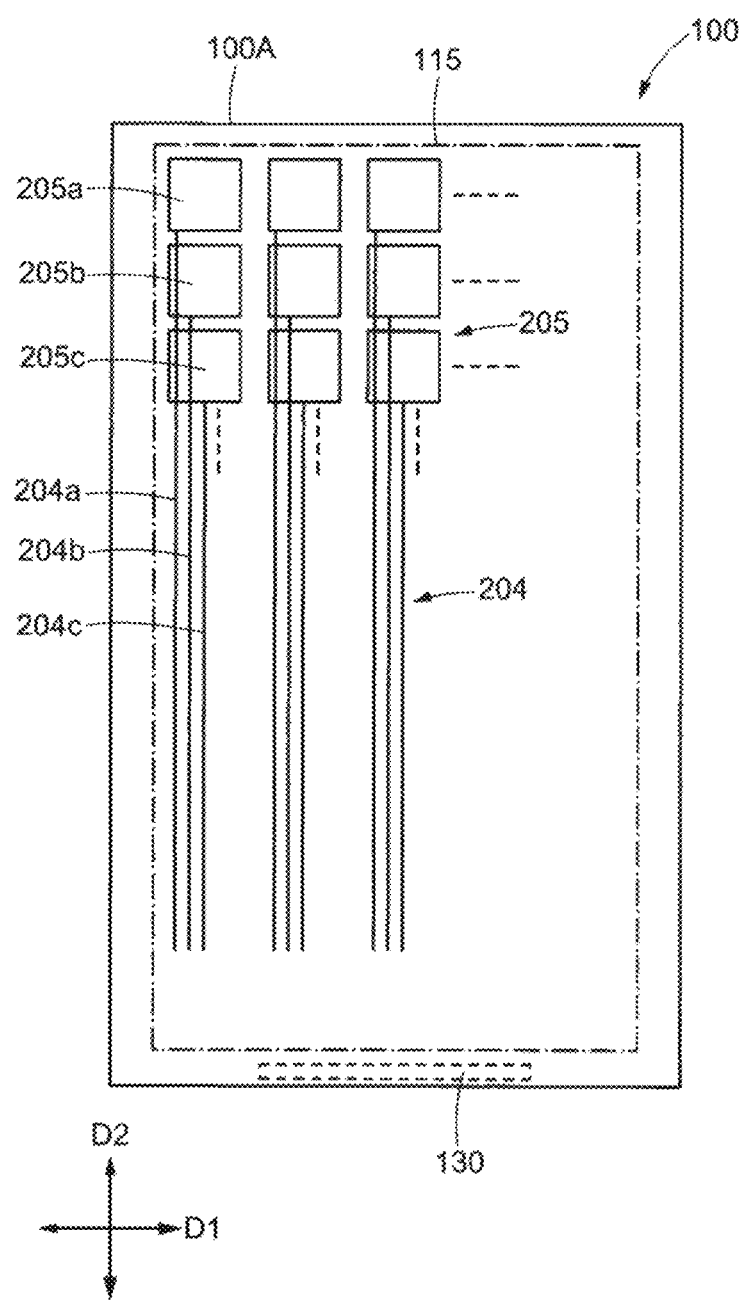
FIG. 3 is a plan view showing a configuration of a touch sensor circuit in a display device according to an embodiment of the present invention.

FIG. 3 is a plan view showing a configuration of a touch sensor circuit 115 in the display device 100 according to an embodiment of the present invention. The touch sensor circuit 115 is arranged in the circuit substrate 100A and is arranged in substantially the same region as the display portion 110 in a plan view. The touch sensor circuit 115 includes a plurality of common electrodes 205 arranged in the direction D1 (row direction) and the direction D2 (column direction), and a plurality of common wirings 204 electrically connected to the plurality of common electrodes 205, respectively. The plurality of common wirings 204 is connected to the terminal portion 130.

As shown in FIG. 3, in the present embodiment, a plurality of common wirings 204a to 204c is connected to each of a plurality of common electrodes 205a to 205c arranged in the direction D2. In other words, in the case where m common electrodes 205 are arranged in the direction D2, the number of common wirings 204 corresponding to one row of common electrodes 205 is m. In the case where the number of common electrodes 205 arranged in the direction D1 is n, a total of n×m common wirings 204 are arranged.

The common wiring 204 is used to apply a predetermined voltage (for example, the ground voltage) to the common electrode 205 or to read a detection signal indicating the touch position from the common electrode 205. In other words, in the present embodiment, the common electrode 205 is used as an electrode for applying a voltage to the liquid crystal layer in a display period, and is used as the detection electrode of the touch sensor in a sensing period. Since a method of detecting the touch position in the self-capacitance type touch sensor is known, descriptions thereof will be omitted.

One common electrode 205 shown in FIG. 3 is arranged across the pixel circuit 200 of the plurality of pixels 112. Although details will be described later, a common electrode for applying a voltage to the liquid crystal layer is arranged in the pixel circuit 200. That is, one common electrode 205 shown in FIG. 3 can be said to be an aggregate of the common electrodes included in a plurality of pixel circuits 200. Each common wiring 204 is electrically connected to one common electrode 205, that is, a plurality of common electrodes included in each of the plurality of pixel circuits 200.

Figure 4:
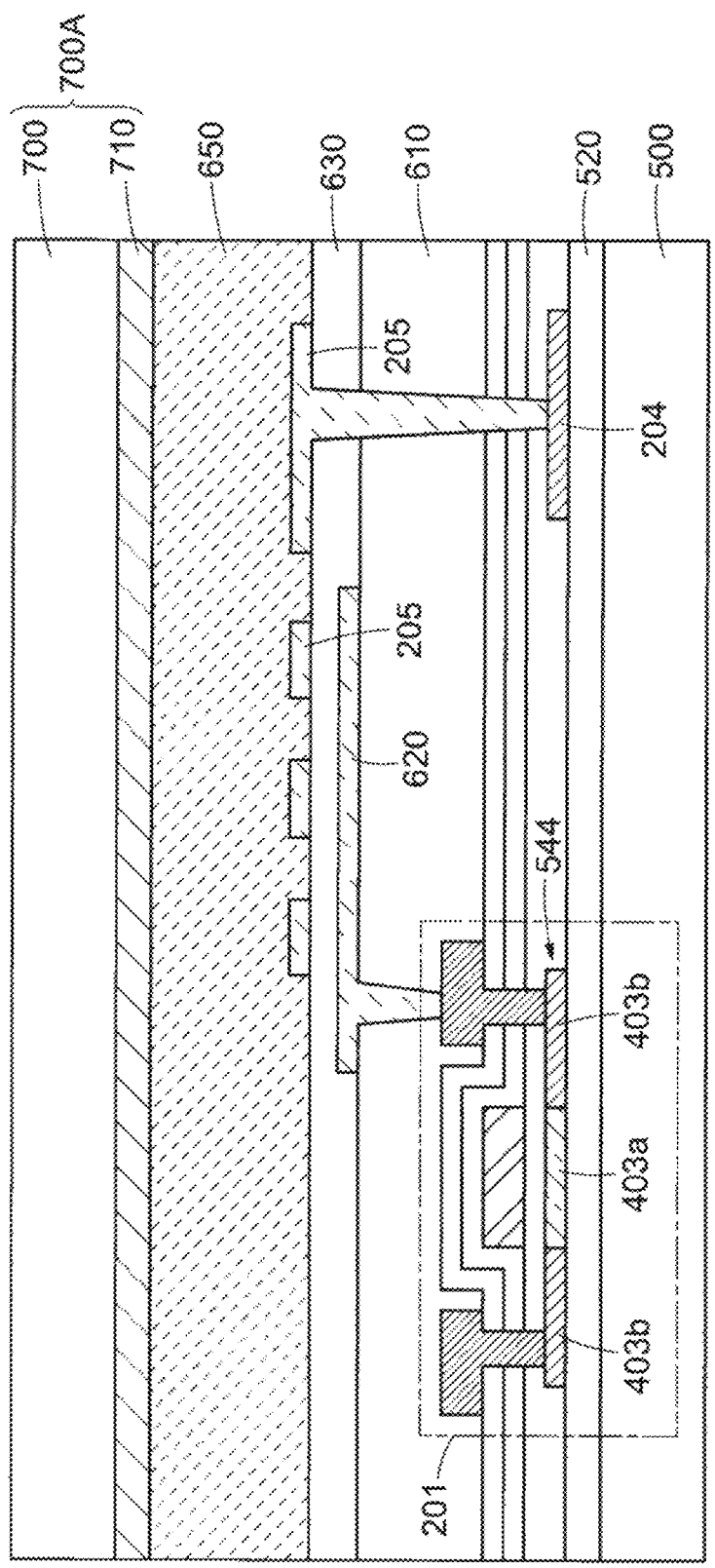
FIG. 4 is a cross-sectional view showing a configuration of a pixel in a display device according to an embodiment of the present invention.

FIG. 4 is a cross-sectional view showing a configuration of the pixel 112 in the display device 100 according to an embodiment of the present invention. As shown in FIG. 4, the select transistor 201 is arranged above a substrate 500. The substrate 500 is a substrate having light transmittance, and for example, a glass substrate or a resin substrate can be used. A base layer 520 is composed of a silicon oxide layer, a silicon nitride layer, or a stacked film of the silicon oxide layer and the silicon nitride layer. The base layer 520 has a role of preventing impurities or the like from entering from the substrate 500.

The select transistor 201 of the present embodiment includes an oxide semiconductor layer 544 composed of an oxide semiconductor with a polycrystalline structure. For example, a metal oxide containing two or more metals including indium (In) is used as the oxide semiconductor. Typically, the oxide semiconductor has light transmittance and is transparent to visible-light. The oxide semiconductor layer 544 includes a channel portion 403a and a conductive portion 403b. The channel portion 403a functions as a channel of the select transistor 201. The conductive portion 403b functions as a source or drain of the select transistor 201. A detailed structure of the select transistor 201 will be described later.

As shown in FIG. 4, the common wiring 204 shown in FIG. 3 is composed of the same layer as the oxide semiconductor layer 544 constituting the select transistor 201. That is, in the present embodiment, the oxide semiconductor layer 544 and the common wiring 204 are elements composed of the same layer structure and the same material, which are derived from the same oxide semiconductor layer. Although details will be described later, the common wiring 204 is formed at the same time as the conductive portion 403b of the oxide semiconductor layer 544. As will be described later, the conductive portion 403b is a portion of the oxide semiconductor layer 544 to which conductivity is imparted in the process of adding impurities. The common wiring 204 is composed of the oxide semiconductor layer imparted with conductivity through the same process as the conductive portion 403b. This point will be described later together with a method for manufacturing the select transistor 201.

A planarization layer 610 is arranged above the select transistor 201 and the common wiring 204. The planarization layer 610 has a role of planarizing undulations on the substrate 500 caused by the formation of the select transistor 201. A pixel electrode 620 is arranged above the planarization layer 610. The pixel electrode 620 is composed of a transparent conductive film containing a metal oxide such as ITO. The pixel electrode 620 is connected to the select transistor 201 via a contact hole arranged in the planarization layer 610.

An insulating layer 630 is arranged above the pixel electrode 620. The insulating layer 630 is composed of a silicon oxide layer, a silicon nitride layer, or a stacked structure thereof. The common electrode 205 is arranged above the insulating layer 630 so as to partially overlap the pixel electrode 620. Similar to the pixel electrode 620, the common electrode 205 is composed of a transparent conductive film including a metal oxide such as ITO. The common electrode 205 is connected to the common wiring 204 via a contact hole arranged in the planarization layer 610 and the insulating layer 630. As described with reference to FIG. 3, the common electrode 205 functions as a detection electrode of the touch sensor by inputting and outputting signals via the common wiring 204 in the sensing period.

In the present embodiment, the common electrode 205 has a comb-like pattern shape. For example, the common electrode 205 has a pattern shape in which a plurality of linear electrodes extending in the direction D2 is connected to linear electrodes extending in the direction D1 in FIG. 1. In the example shown in FIG. 4, three electrode patterns overlapping the pixel electrode 620 are shown, which correspond to cross-sections of the plurality of linear electrodes extending in the direction D2, and are electrically connected to each other. That is, in FIG. 4, the common electrode 205 is electrically connected to the common wiring 204.

In the present embodiment, an FFS (Fringe Field Switching) method is used in which a fringe electric field is formed between the pixel electrode 620 and the common electrode 205 to orient the liquid crystal molecules of a liquid crystal layer 650. Since the FFS method is known as the driving method of a liquid crystal display device, the explanation thereof will be omitted. In forming the fringe electric field, a predetermined voltage (for example, the ground voltage) is applied to the common electrode 205. That is, the strength of the fringe electric field is controlled by the voltage applied to the pixel electrode 620. As described above, the common electrode 205 is held at a constant voltage via the common wiring 204 in the display period, so that it functions as an electrode for applying a voltage to the liquid crystal layer.

In the present embodiment, although an example in which the FFS method for forming the fringe electric field between the pixel electrode 620 and the common electrode 205 is adopted has been described, the present invention is not limited to this example, and for example, an IPS (In-Plane Switching) method may be adopted. In this case, both the pixel electrode and the common electrode may be configured in the comb-like pattern shape, and comb-like portions of the pixel electrode and the common electrode may be arranged so as to face each other. In the IPS method, a lateral electric field is formed by the pixel electrode and the common electrode facing each other in the transverse direction, and orientation control of the liquid crystal molecules is performed by the lateral electric field.

A substrate 700 and a color filter 710 are arranged above the pixel electrode 620 and the common electrode 205 via the liquid crystal layer 650. In the present embodiment, the substrate 700 and the color filter 710 are collectively referred to as a counter substrate 700A. The liquid crystal layer 650 is arranged between the circuit substrate 100A and the counter substrate 700A, which are bonded together using a sealing material (not shown). Although not shown in FIG. 4, an orientation film is arranged on surfaces of the circuit substrate 100A and the counter substrate 700A in contact with the liquid crystal layer 650. In the present embodiment, although only the color filter 710 is illustrated on the substrate 700, a light-shielding film (a so-called black matrix) may be arranged as needed.

As described above, in the present embodiment, the pixel 112 includes the common electrode 205 arranged overlapping the pixel electrode 620, and the common electrode 205 is electrically connected to the common wiring 204. In this case, the common wiring 204 is composed of the oxide semiconductor layer 544 that functions as an active layer (a semiconductor layer including the channel portion 403a) of the semiconductor device (in this case, the select transistor 201) arranged in the respective pixels 112. The common wiring 204 does not need to be entirely composed of the oxide semiconductor layer 544, but at least part thereof may be composed of the oxide semiconductor layer 544.

The oxide semiconductor layer 544 used in the select transistor 201 of the present embodiment has a polycrystalline structure and is excellent in crystallinity. In addition, the conductive portion 403b in which conductivity is imparted to the oxide semiconductor layer 544 of the present embodiment has a feature that resistance is significantly lower than that of the conventional one. Specifically, the sheet resistance of the conductive portion 403b is 1000 Ω/sq. or less (preferably 500 Ω/sq. or less, more preferably 250 Ω/sq. or less), and can be sufficiently used as a wiring. The display device 100 of the present embodiment focuses on the physical properties of the oxide semiconductor layer 544 and the common wiring 204 used as the touch sensor circuit 115 is composed of the same layer as the oxide semiconductor layer 544.

According to the present embodiment, the common wiring 204 for a touch sensor, which is a factor for reducing the aperture ratio of the display portion 110 in the prior art, can be composed of a light transmittance material (specifically, the oxide semiconductor layer 544 composed of a metal oxide). Moreover, since the common wiring 204 can be composed of the same layer as the oxide semiconductor layer 544 used for the select transistor 201, the aperture ratio of the display portion of the display device 100 can be improved with a simple structure.

The structure of the display portion 110 described above is realized by reducing the resistance of the oxide semiconductor layer to a level that can be used as a wiring. Specifically, it is realized by reducing the resistance of the conductive portion 403b of the select transistor 201 which is a semiconductor device using an oxide semiconductor. Therefore, the configuration and manufacturing method of the semiconductor device (the select transistor 201 in FIG. 4) used in the present embodiment will be described below.

[Configuration of Semiconductor Device]

Figure 5:
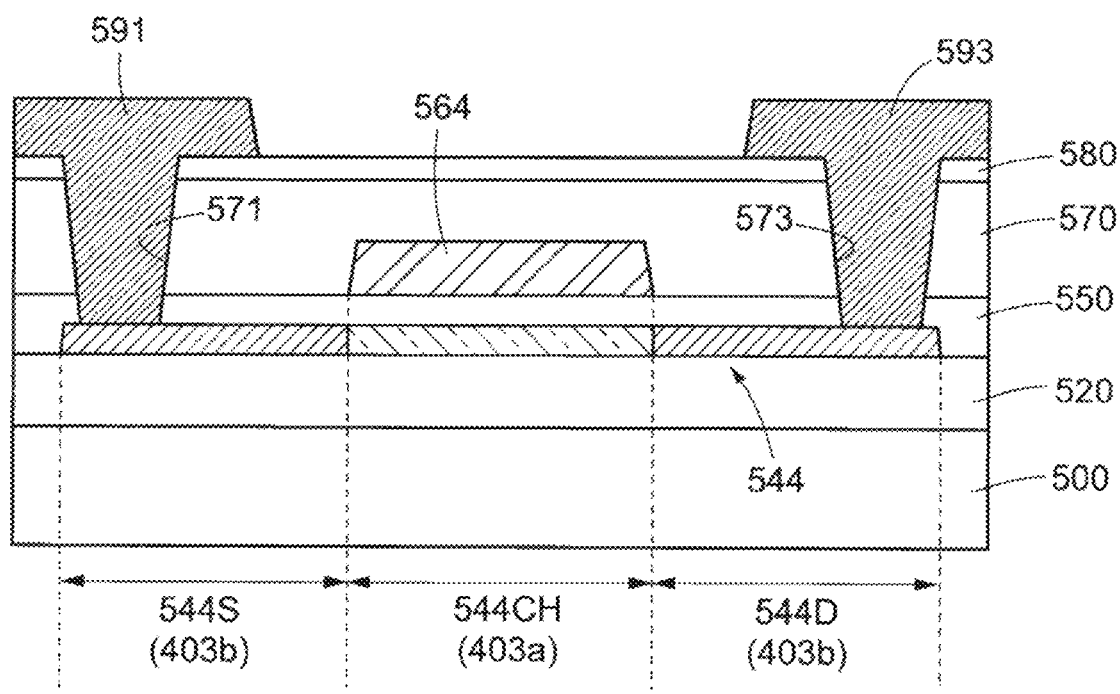
FIG. 5 is a cross-sectional view showing a configuration of a semiconductor device used in a display device according to an embodiment of the present invention.
Figure 6:
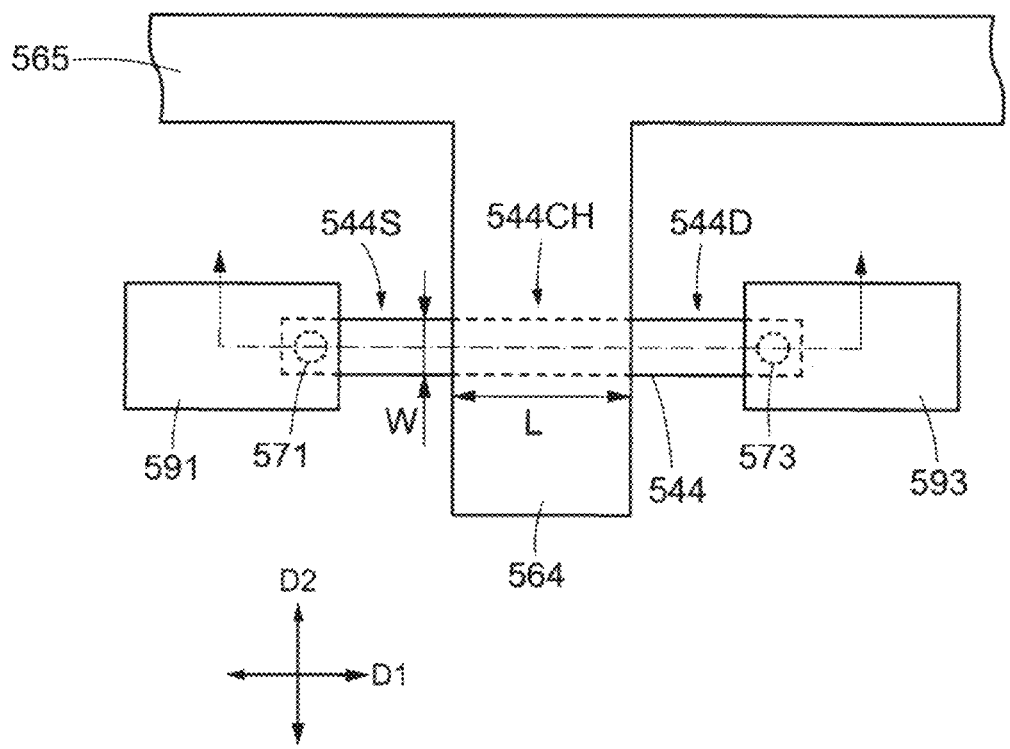
FIG. 6 is a plan view showing a configuration of a semiconductor device used in a display device according to an embodiment of the present invention.

FIG. 5 is a cross-sectional view showing a configuration of a semiconductor device 10 used in the display device 100 according to an embodiment of the present invention. FIG. 6 is a plan view showing a configuration of the semiconductor device 10 used in the display device 100 according to an embodiment of the present invention. FIG. 5 corresponds to a cross-sectional view when cut with a dashed line shown in FIG. 6. For convenience of explanation, the semiconductor device 10 shown in FIG. 5 and the select transistor 201 shown in FIG. 4 basically have the same structure.

As shown in FIG. 5, the semiconductor device 10 is arranged above the substrate 500. The semiconductor device 10 includes the base layer 520, the oxide semiconductor layer 544, a gate insulating layer 550, a gate electrode 564, an insulating layer 570, an insulating layer 580, a source electrode 591, and a drain electrode 593.

The base layer 520 is arranged above the substrate 500. The oxide semiconductor layer 544 is arranged above the base layer 520. The oxide semiconductor layer 544 is in contact with the base layer 520. Among a main surface of the oxide semiconductor layer 544, a surface in contact with the gate insulating layer 550 is referred to as an upper surface, and a surface in contact with the base layer 520 is referred to as a lower surface. In addition, a surface between the upper surface and the lower surface is referred to as a side surface. The base layer 520 functions as a barrier film that shields impurities that diffuse from the substrate 500 toward the oxide semiconductor layer 544.

The oxide semiconductor layer 544 has light transmittance. In addition, the oxide semiconductor layer 544 is divided into a source region 544S, a drain region 544D, and a channel region 544CH. The channel region 544CH is a region vertically below the gate electrode 564 of the oxide semiconductor layer 544. The source region 544S is a region of the oxide semiconductor layer 544 that does not overlap the gate electrode 564 and that is closer to the source electrode 591 than the channel region 544CH. The drain region 544D is a region of the oxide semiconductor layer 544 that does not overlap the gate electrode 564 and that is closer to the drain electrode 593 than the drain region 544CH. The channel region 544CH corresponds to the channel portion 403a shown in FIG. 4, and the source region 544S and the drain region 544D respectively correspond to the conductive portion 403b shown in FIG. 4.

The gate electrode 564 is composed of a metal layer and faces the oxide semiconductor layer 544. The gate insulating layer 550 is arranged between the oxide semiconductor layer 544 and the gate electrode 564. The gate insulating layer 550 is in contact with the oxide semiconductor layer 544. The insulating layer 570 and the insulating layer 580 are respectively arranged above the gate insulating layer 550 and the gate electrode 564. Contact holes 571 and 573 that reach the oxide semiconductor layer 544 are arranged in the insulating layer 570 and the insulating layer 580. The source electrode 591 is in contact with the source region 544S via the contact hole 571. The drain electrode 593 is in contact with the drain region 544D via the contact hole 573.

The oxide semiconductor layer 544 has a polycrystalline structure including a plurality of crystal grains. Although details will be described later, using a Poly-OS (Poly-crystalline Oxide Semiconductor) technique makes it possible to form the oxide semiconductor layer 544 with a polycrystalline structure. In the following explanation, the oxide semiconductor with a polycrystalline structure itself may be referred to as the Poly-OS.

In the present embodiment, the oxide semiconductor layer 544 includes two or more metals including indium, and the ratio of indium in the two or more metals is 50% or more. Gallium (Ga), zinc (Zn), aluminum (Al), hafnium (Hf), yttrium (Y), zirconium (Zr), and lanthanoids are used as a metal element other than indium. However, it is not limited to this example, the oxide semiconductor layer 544 may contain metal elements other than those described above.

In addition, the source region 544S and the drain region 544D may contain an element other than the metal element. The source region 544S and the drain region 544D have lower resistance rates than the channel region 544CH, which will be described later. Such a decrease in resistance ratio is realized in a process of adding an element such as argon (Ar), phosphorus (P), or boron (B) (hereinafter, referred to as "impurity element") to the oxide semiconductor layer 544.

The concentration of the impurity element contained in the source region 544S and the drain region 544D is preferably $1\times10^{18}$ cm$^{-3}$ or more and $1\times10^{21}$ cm$^{-3}$ or less as measured by a SIMS analysis (secondary ion mass spectrometry). In the case where the source region 544S and the drain region 544D contain the impurity element at $1\times10^{18}$ cm$^{-3}$ or more and $1\times10^{21}$ cm$^{-3}$ or less, it is presumed that the impurity element was intentionally added by an ion implantation method or an ion doping method. However, the source region 544S and the drain region 544D may contain the impurity element other than argon (Ar), phosphorus (P), or boron (B) at a concentration of less than $1\times10^{18}$ cm$^{-3}$. In addition, in the case where the impurity element is contained in the channel region 544CH, the property of the semiconductor device 10 is affected. Therefore, the concentration of the impurity element contained in the channel region 544CH is preferably less than $1\times10^{18}$ cm$^{-3}$ (more preferably $1\times10^{16}$ cm$^{-3}$ or less).

The gate electrode 564 has a function as a top-gate of the semiconductor device 10. The gate insulating layer 550 has a function as a gate insulating layer for the top-gate, and has a function of releasing oxygen by heat treatment in a manufacturing process. The insulating layer 570 and the insulating layer 580 respectively insulate between the gate electrode 564 and the source electrode 591 and between the gate electrode 564 and the drain electrode 593. As a result, parasitic capacitances generated between the gate electrode 564 and the source electrode 591 and between the gate electrode 564 and the drain electrode 593 can be reduced.

As shown in FIG. 6, a gate wiring 565 extends in a first direction (the direction D1). Part of the gate wiring 565 branches toward a second direction (the direction D2) and overlaps the oxide semiconductor layer 544. Part the gate wiring 565 overlapping the oxide semiconductor layer 544 functions as the gate electrode 564. A length of a region where the oxide semiconductor layer 544 and the gate electrode 564 overlap in the first direction (the direction D1) (that is, the channel region 544CH) is a channel length (L), and a length in the second direction (the direction D2) is a channel width (W).

[Crystal Structure of Oxide Semiconductor Layer]

The oxide semiconductor layer 544 and the common wiring 204 of the present embodiment include the Poly-OS. In the following explanation, although the oxide semiconductor layer 544 is exemplified, the same explanation can be made for the common wiring 204 composed of the same layer as the oxide semiconductor layer 544.

Particle diameter of the particle grains contained in the Poly-OS observed from the upper surface of the oxide semiconductor layer 544 (or a thickness direction of the oxide semiconductor layer 544) is 0.1 μm or more, preferably 0.3 μm or more, and more preferably 0.5 μm or more. For example, the particle diameter of the crystal grains can be obtained using a cross-sectional SEM observation, a cross-sectional TEM observation, or an electron back scattered diffraction (EBSD) method.

In the Poly-OS, the plurality of crystal grains may have one type of crystal structure, or may have a plurality of types of crystal structure. The crystal structure of the Poly-OS can be identified using an electron diffraction method or an XRD method, or the like. That is, the crystal structure of the oxide semiconductor layer 544 can be identified using the electron diffraction method, the XRD method, or the like.

The crystal structure of the oxide semiconductor layer 544 is preferably cubic. The cubic crystal has a high symmetry of the crystal structure, and even when oxygen defects are generated in the oxide semiconductor layer 544, the structure relaxation is unlikely to occur and the crystal structure is stable. As described above, the oxide semiconductor layer 544 includes two or more metals including indium, and the ratio of indium in the two or more metals is 50% or more. The crystal structure of each of the plurality of crystal grains is controlled by increasing the ratio of the indium element, and the oxide semiconductor layer 544 with a cubic crystal structure can be formed.

As shown in FIG. 5, the oxide semiconductor layer 544 includes the channel portion 403*a* (see FIG. 4) corresponding to the channel region 544CH and the conductive portion 403*b* (see FIG. 4) corresponding to the source region 544S and the drain region 544D. In the oxide semiconductor layer 544, the channel portion 403*a* has a first crystal structure and the conductive portion 403*b* has a second crystal structure. Although the conductive portion 403*b* has a higher electric conductivity than the channel portion 403*a*, the second crystal structure is the same as the first crystal structure. In this case, the two crystal structures are the same means that the crystal systems are the same. For example, in the case where the crystal structure of the oxide semiconductor layer 544 is cubic, the crystal structure of the first crystal structure of the channel portion 403*a* and the crystal structure of the conductive portion 403*b* are both cubic and identical. For example, the first crystal structure and the second crystal structure can be identified by a microelectron diffraction method.

In addition, in a predetermined crystal orientation, a plane interval d of the first crystal structure and a plane interval d of the second crystal structure are substantially the same. In this case, two plane intervals d are substantially the same means that one plane interval d is 0.95 times or more and 1.05 times or less the other plane interval d. Alternatively, it means that the two diffraction patterns are almost identical in the microelectron diffraction method.

There may be no grain boundaries between the channel portion 403*a* and the conductive portion 403*b*. In addition, the channel portion 403*a* and the conductive portion 403*b* may be contained in one crystal grain. In other words, the change from the channel portion 403a to the conductive portion 403b may be a continual change in the crystal structure.

Figure 7A:
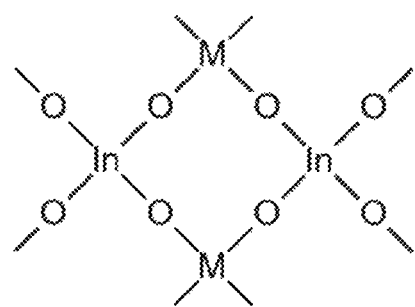
FIG. 7A is a schematic view for explaining a bonding state of Poly-OS contained in a conductive portion of an oxide semiconductor layer.
Figure 7B:
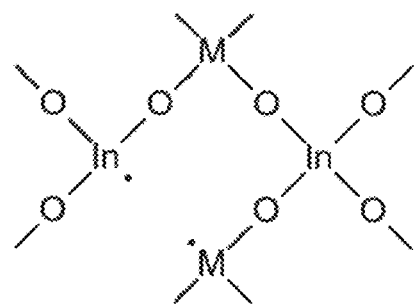
FIG. 7B is a schematic view for explaining a bonding state of Poly-OS contained in a conductive portion of an oxide semiconductor layer.
Figure 7C:
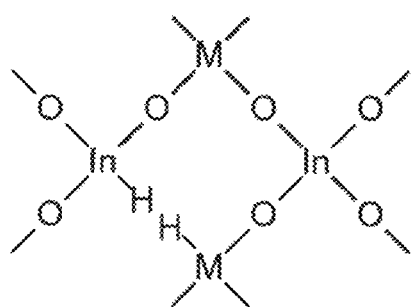
FIG. 7C is a schematic view for explaining a bonding state of Poly-OS contained in a conductive portion of an oxide semiconductor layer.

FIG. 7A to FIG. 7C are schematic diagrams for explaining a bonding state of the Poly-OS contained in the conductive portion 403b of the oxide semiconductor layer 544. FIG. 7A to FIG. 7C show the Poly-OS containing indium atoms (In atoms) and metal atoms (M atoms) that differ from the In atoms.

In the Poly-OS shown in FIG. 7A, each of the In atom and the metal atom M is bonded to an oxygen atom (O atom). In the crystal structure of the Poly-OS shown in FIG. 7A, in order to increase the electric conductivity than the channel portion 403a, the bond between the In atoms and the O atoms (or the metal atoms M and O atoms) is broken in the conductive portion 403b, and oxygen defects in which the O atoms are eliminated are generated (see FIG. 7B). Since the Poly-OS contains crystal grains having a large particle diameter, long-range order is easily maintained. Therefore, even if the oxygen defects are generated, the structural relaxation hardly occurs, and the positions of the In atoms and the metal atoms M hardly change. If hydrogen is present in the state shown in FIG. 7B, a dangling bond of the In atoms and a dangling bond of the metal atoms M in the oxygen defects are bonded to hydrogen atoms (H atoms) and stabilized (see FIG. 7C). Since the H atoms in the oxygen defects function as donors, the carrier concentration of the conductive portion 403b increases.

In addition, as shown in FIG. 7C, in the Poly-OS, even if the H atoms are bonded in the oxygen defects, the positions of the In atoms and the metal atoms M hardly change. Therefore, the second crystal structure of the conductive portion 403b does not change from the crystal structure of the Poly-OS without oxygen defects. That is, the second crystal structure of the conductive portion 403b is the same as the first crystal structure of the channel portion 403a.

Figure 8:
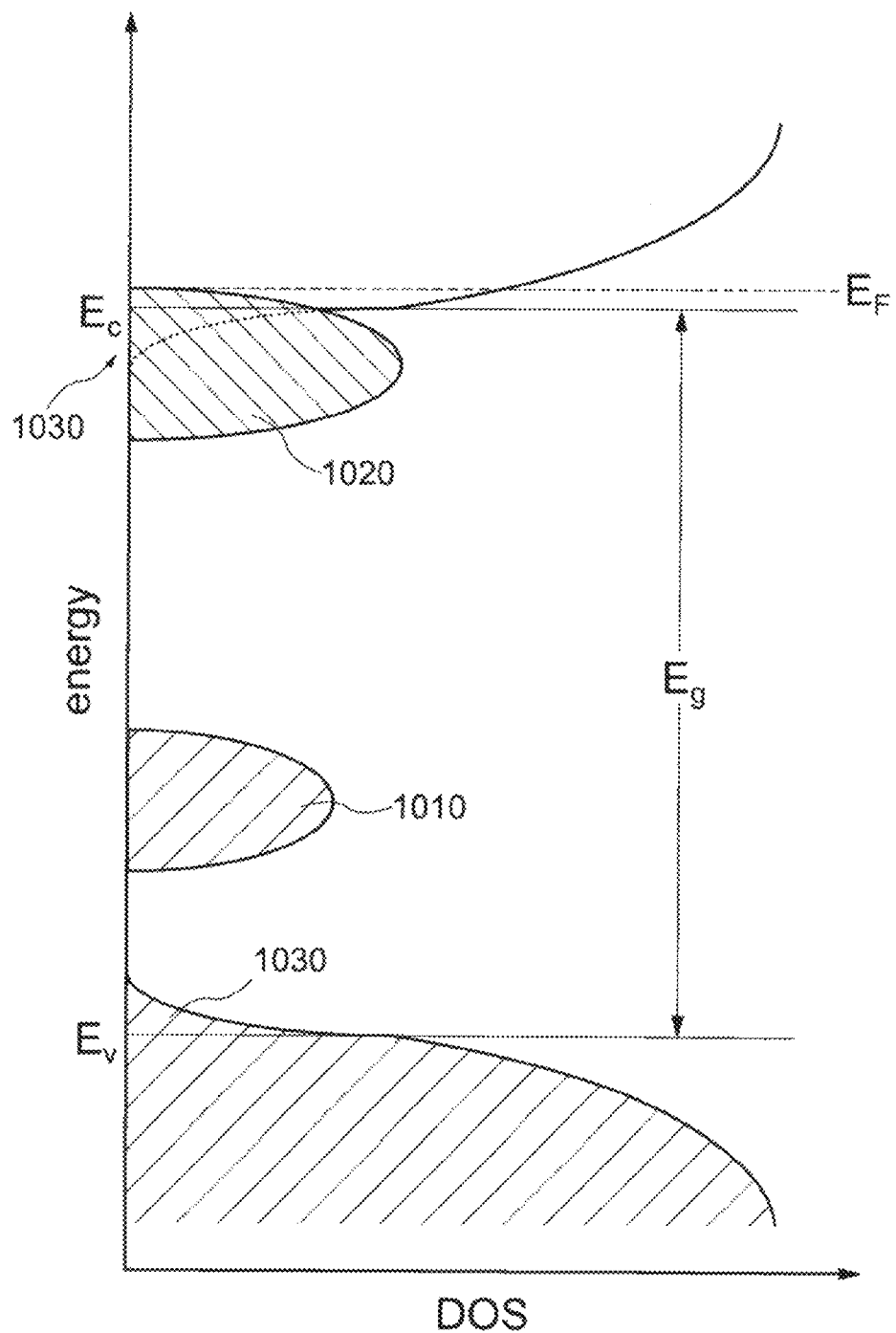
FIG. 8 is a band diagram for explaining a band structure of a conductive portion of an oxide semiconductor layer.

FIG. 8 is a band diagram for explaining the band structure of the conductive portion 403b of the oxide semiconductor layer 544.

As shown in FIG. 8, in the Poly-OS of the conductive portion 403b, a first energy level 1010 and a second energy level 1020 are included in a bandgap $E_g$. In addition, a tail level 1030 is included in the vicinity of an energy level $E_V$ at the upper end of a valence band and in the vicinity of an energy level $E_C$ at the lower end of a conduction band. The first energy level 1010 is a deep trap level present in the bandgap $E_g$ and is attributed to the oxygen defects. The second energy level 1020 is a donor level present near the lower end of the conduction band and is attributed to the hydrogen atoms bonded within the oxygen defects. The tail level 1030 is caused by a disturbance of long-range order.

Although the Poly-OS in the conductive portion 403b contains oxygen defects, it has the crystal structure, and the long-range order is maintained. In addition, in the Poly-OS of the conductive portion 403b, the hydrogen atoms can be bonded in the oxygen defects without causing structural disturbance. Therefore, it is possible to increase DOS (Density of State) of the second energy level 1020 while suppressing DOS of the tail level 1030. Therefore, the DOS of the second energy level 1020 is larger than the DOS of the tail level 1030 near the lower end of the conduction band, and the DOS of the second energy level 1020 can extend beyond the energy level $E_C$ at the lower end of the conduction band. That is, the Fermi level $E_F$ exceeds the energy level $E_C$ at the lower end of the conduction band, and the Poly-OS in the conductive portion 403b has a metal property.

As described above, the Poly-OS in the conductive portion 403b has a metal property unlike the conventional oxide semiconductor. Therefore, the conductive portion 403b can be made sufficiently low in resistance by generating the oxygen defects. The sheet resistance of the conductive portion 403b is 1000 Ω/sq. or less, preferably 500 Ω/sq. or less, and more preferably 250 Ω/sq. or less.

As described above, in the present embodiment, it is possible to sufficiently reduce the resistance of the source region 544S and the drain region 544D (that is, the conductive portion 403b) of the oxide semiconductor layer 544, so that the conductive portion 403b can be used as a wiring. The common wiring 204 shown in FIG. 3 and FIG. 4 utilizes such features of the oxide semiconductor layer 544.

In the present embodiment, a light-shielding layer may be arranged between the substrate 500 and the oxide semiconductor layer 544. Since the light-shielding layer is arranged in a region overlapping the channel region 544CH, the characteristic variation of the semiconductor device 10 due to the irradiation of light to the channel region 533CH. The semiconductor device 10 may have a dual-gate configuration by using light-shielding layer as a gate electrode.

[Method for Manufacturing Semiconductor Device]

Figure 9:
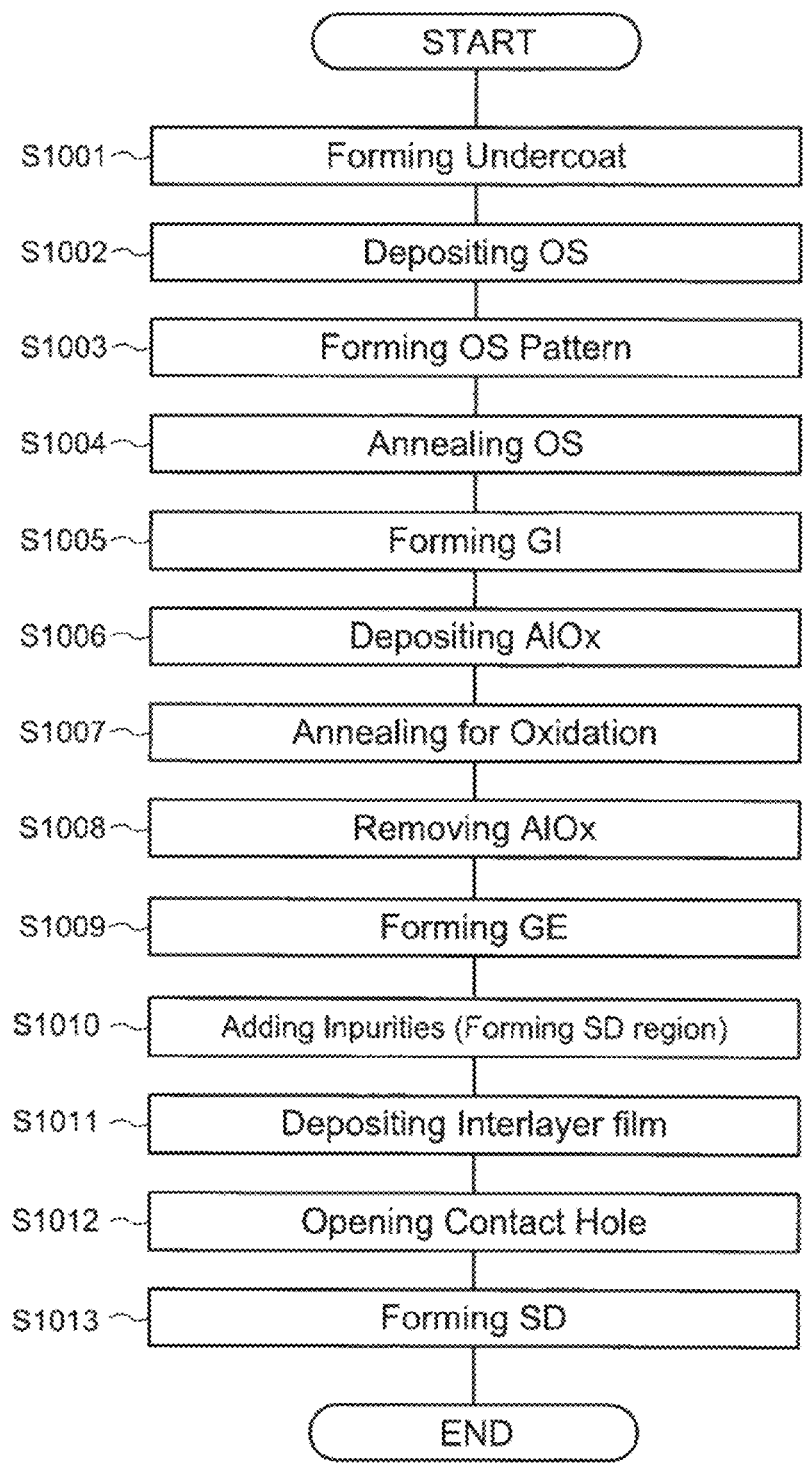
FIG. 9 is a sequence diagram showing a method for manufacturing a semiconductor device used in a display device according to an embodiment of the present invention.

A method for manufacturing the semiconductor device 10 used in the display device 100 according to an embodiment of the present invention will be described with reference to FIG. 9 to FIG. 18. FIG. 9 is a sequence diagram showing the method for manufacturing the semiconductor device 10 used in the display device 100 according to an embodiment of the present invention. FIG. 10 to FIG. 18 are cross-sectional views showing the method for manufacturing the semiconductor device 10 used in the display device 100 according to an embodiment of the present invention.

Figure 10:
FIG. 10 is a cross-sectional view showing a method for manufacturing a semiconductor device used in a display device according to an embodiment of the present invention.

First, as shown in FIG. 9 and FIG. 10, the base layer 520 is formed above the substrate 500 (step S1001).

A rigid substrate having light transmittance such as a glass substrate, a quartz substrate, a sapphire substrate, or the like is used as the substrate 500. In the case where the substrate 500 needs to have flexibility, a substrate containing a resin such as a polyimide substrate, an acryl substrate, a siloxane substrate, or a fluororesin substrate is used as the substrate 500. In the case where the substrate containing a resin is used as the substrate 500, an impurity element may be introduced into the resin in order to improve the heat resistance of the substrate 500.

The base layer 520 is formed by a CVD (Chemical Vapor Deposition) method or a sputtering method. A general insulating material is used as the base layer 520. For example, an inorganic insulating material such as silicon oxide ($SiO_x$), silicon oxynitride ($SiO_xN_y$), silicon nitride ($SiN_x$), silicon nitride oxide ($SiN_xO_y$), aluminum oxide ($AlO_x$), aluminum oxynitride ($AlO_xN_y$), aluminum nitride oxide ($AlN_xO_y$), and aluminum nitride ($AlN_x$) are used as the base layer 520.

The $SiO_xN_y$ and $AlO_xN_y$ are a silicon compound and an aluminum compound containing a smaller proportion (x>y) of nitrogen (N) than oxygen (O). $SiN_xO_y$ and $AlN_xO_y$ are a silicon compound and an aluminum compound containing a lower proportion (x>y) of oxygen than nitrogen.

The base layer 520 is formed of a single-layer structure or a stacked structure. In the case where the base layer 520 has a stacked structure, an insulating material containing nitrogen and an insulating material containing oxygen are preferably formed in this order from the substrate 500. For example, impurities that diffuse from the substrate 500 toward the oxide semiconductor layer 544 can be blocked by using the insulating material containing nitrogen. In addition, using the insulating material containing oxygen makes it possible to release oxygen by heat treatment. For example, the temperature of the heat treatment in which the insulating material containing oxygen releases oxygen is 600° C. or less, 500° C. or less, 450° C. or less, or 400° C. or less. That is, for example, the insulating material containing oxygen releases oxygen at the heat treatment temperature performed in the method for manufacturing the semiconductor device 10 using a glass substrate as the substrate 500. In the present embodiment, for example, silicon nitride is used as the insulating material containing nitrogen. For example, silicon oxide is used as the insulating material containing oxygen.

Figure 11:
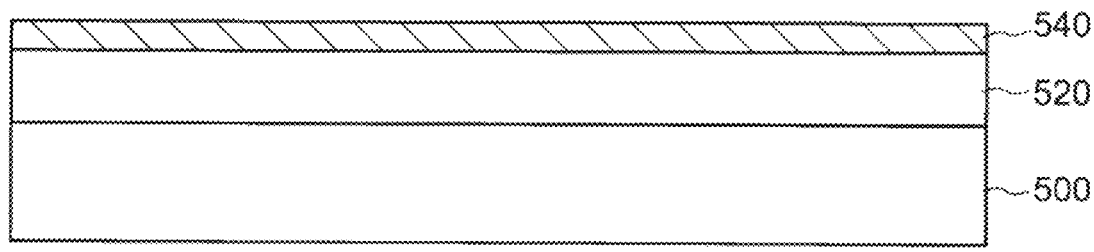
FIG. 11 is a cross-sectional view showing a method for manufacturing a semiconductor device used in a display device according to an embodiment of the present invention.

Next, as shown in FIG. 9 and FIG. 11, an oxide semiconductor layer 540 is formed above the base layer 520 (step S1002). The oxide semiconductor layer 540 is formed by the sputtering method or an atomic layer deposition method (ALD). For example, a thickness of the oxide semiconductor layer 540 is 10 nm or more and 100 nm or less, 15 nm or more and 70 nm or less, or 20 nm or more and 40 nm or less.

A metal oxide with semiconductor properties can be used as the oxide semiconductor layer 540. For example, an oxide semiconductor containing two or more metals including indium (In) is used as the oxide semiconductor layer 540. In addition, the ratio of indium in the two or more metals is 50% or more. Gallium (Ga), zinc (Zn), aluminum (Al), hafnium (Hf), yttrium (Y), zirconia (Zr), or lanthanoids are used as the oxide semiconductor layer 540 in addition to indium. Elements other than those described above may be used as the oxide semiconductor layer 540. In the present embodiment, a metal oxide (an IGO-based oxide semiconductor) containing indium and gallium (Ga) is used as the oxide semiconductor layer 540.

In the case where the oxide semiconductor layer 540 is crystallized by an OS annealing (step S1004) described later, the oxide semiconductor layer 540 after the film formation and before annealing is preferably amorphous (a state in which crystalline components of the oxide semiconductor are zero or small). In other words, a method for forming the oxide semiconductor layer 540 is preferably such that the oxide semiconductor layer 540 immediately after the film formation is not crystallized as much as possible. For example, in the case where the oxide semiconductor layer 540 is formed by the sputtering method, a condition in which the oxide semiconductor layer 540 is not crystallized can be achieved by controlling the temperature of an object to be film-formed (the substrate 500 and the structure formed thereon).

When a film is formed on the object to be film-formed by the sputtering method, ions generated in the plasma and the atoms recoiled by a sputtering target collide with the object to be film-formed, so that the temperature of the object to be film-formed increases with the film-forming process. When the temperature of the object to be film-formed during the film forming process increases, microcrystals are contained in the oxide semiconductor layer 540 in a state immediately after the film formation, and crystallization due to subsequent OS annealing is inhibited. For example, in order to control the temperature of the object to be film-formed as described above, the film formation can be performed while cooling the object to be film-formed. For example, the object to be film-formed can be cooled from a surface opposite to a surface of the object to be film-formed so that the temperature of the surface of the object to be film-formed (hereinafter, referred to as "film-forming temperature") is 100° C. or less, 70° C. or less, 50° C. or less, or 30° C. or less. As described above, forming the oxide semiconductor layer 540 while cooling the object to be formed makes it possible to form the oxide semiconductor layer 540 with few crystalline components in a state immediately after the film formation.

Figure 12:
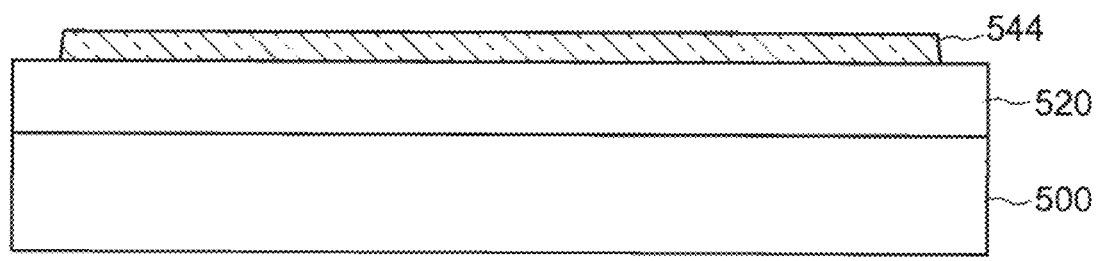
FIG. 12 is a cross-sectional view showing a method for manufacturing a semiconductor device used in a display device according to an embodiment of the present invention.

Next, as shown in FIG. 9 and FIG. 12, a pattern of the oxide semiconductor layer 540 is formed by photolithography (step S1003). Although not shown, a resist mask is formed above the oxide semiconductor layer 540, and the oxide semiconductor layer 540 is etched using the resist mask. Either wet etching or dry etching may be used when etching the oxide semiconductor layer 540. In the case of wet etching, etching can be performed using an acidic etchant. For example, oxalic acid or hydrofluoric acid can be used as the etchant.

The oxide semiconductor layer 540 is preferably processed in a pattern before the OS annealing performed in step S1004. When the oxide semiconductor layer 540 is crystallized by the OS annealing, it tends to be difficult to etch. In addition, even if the oxide semiconductor layer 540 is damaged by etching, the damage can be repaired by the OS annealing.

Heat treatment (OS annealing) is performed on the oxide semiconductor layer 540 (step S1004) after the oxide semiconductor layer 540 is patterned. In the OS annealing, the oxide semiconductor layer 540 is held at a predetermined reaching temperature for a predetermined time. The predetermined reaching temperature is 300° C. or more and 500° C. or less, preferably 350° C. or more and 450° C. or less. In addition, the holding time at the reaching temperature is 15 minutes or more and 120 minutes or less, preferably 30 minutes or more and 60 minutes or less. Performing OS annealing crystallizes the oxide semiconductor layer 540, and the oxide semiconductor layer 544 with a polycrystalline structure is formed.

In addition, in the case where the display device 100 of the present embodiment is manufactured, the oxide semiconductor layer 544 of the select transistor 201 is formed, and at the same time, a wiring pattern composed of an oxide semiconductor layer used for the common wiring 204 is formed. Therefore, the wiring pattern formed by this process has the same crystal structure as the oxide semiconductor layer 544.

Figure 13:
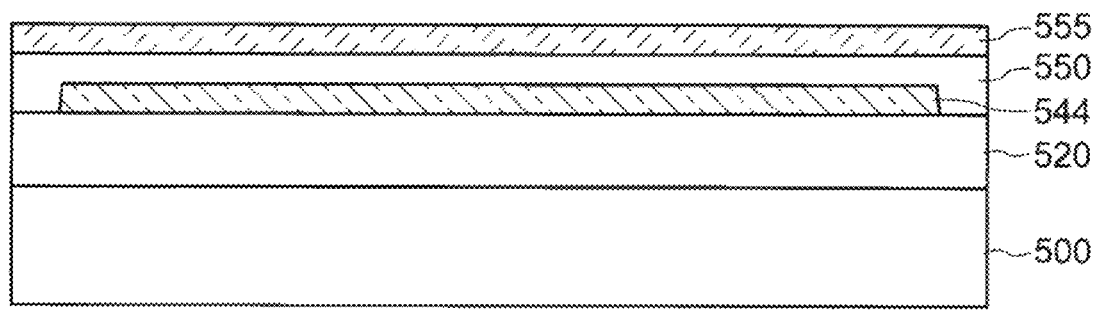
FIG. 13 is a cross-sectional view showing a method for manufacturing a semiconductor device used in a display device according to an embodiment of the present invention.

Next, as shown in FIG. 9 and FIG. 13, the gate insulating layer 550 is formed above the oxide semiconductor layer 544 (step S1005).

A method for forming the gate insulating layer 550 and the insulating material may be referred to the explanation of the base layer 520. In the present embodiment, a thickness of the gate insulating layer 550 is, for example, 50 nm or more and 150 nm or less, but is not limited to this example.

An insulating material containing oxygen is preferably used as the gate insulating layer 550. An insulating layer with few defects is preferably used as the gate insulating layer 550. For example, when a composition ratio of oxygen in the gate insulating layer 550 is compared with a composition ratio of oxygen in an insulating layer having a composition similar to that of the gate insulating layer 550 (hereinafter referred to as "other insulating layer"), the composition ratio of oxygen in the gate insulating layer 550 is closer to the stoichiometric ratio with respect to the insulating layer than the composition ratio of oxygen in the other insulating layer. For example, in the case where silicon oxide ($SiO_x$) is used for each of the gate insulating layer 550 and the insulating layer 580, a composition ratio of oxygen in the silicon oxide used as the gate insulating layer 550 is closer to the stoichiometric ratio of silicon oxide than the composition ratio of oxygen in the silicon oxide used as the insulating layer 580. For example, a layer in which no defects are observed when evaluated by electron spin resonance method (ESR) may be used as the gate insulating layer 550.

The gate insulating layer 550 may be formed at a film-forming temperature of 350° C. or higher in order to form the insulating layer with few defects as the gate insulating layer 550. In addition, after the gate insulating layer 550 is formed, a process of implanting oxygen into part of the gate insulating layer 550 may be performed. In the present embodiment, a silicon oxide layer is formed at a film-forming temperature of 350° C. or higher in order to form the insulating layer with few defects as the gate insulating layer 550.

Next, as shown in FIG. 9 and FIG. 13, a metal oxide layer 555 containing aluminum as a main component is formed above the gate insulating layer 550 (step S1006).

The metal oxide layer 555 is formed by a sputtering method. Oxygen is implanted into the gate insulating layer 550 by the film formation of the metal oxide layer 555. For example, an inorganic insulating layer such as aluminum oxide ($AlO_x$), aluminum oxynitride ($AlO_xN_y$), aluminum nitride oxide ($AlN_xO_y$), and aluminum nitride ($AlN_x$) is used as the metal oxide layer containing aluminum as the main component. The "metal oxide layer containing aluminum as the main component" means that the proportion of aluminum contained in the metal oxide layer 555 is 1% or more of the entire metal oxide layer 555. The proportion of aluminum contained in the metal oxide layer 555 may be 5% or more and 70% or less, 10% or more and 60% or less, or 30% or more and 50% or less of the entire metal oxide layer 555. The proportion may be a mass ratio or a weight ratio.

For example, the thickness of the metal oxide layer 555 is 5 nm or more and 100 nm or less, 5 nm or more and 50 nm or less, 5 nm or more and 30 nm or less, or 7 nm or more and 15 nm or less. In the present embodiment, aluminum oxide is used as the metal oxide layer 555. Aluminum oxide has a high barrier property against gas. In the present embodiment, the aluminum oxide used as the metal oxide layer 555 suppresses the oxygen implanted into the gate insulating layer 550 from diffusing outward at the time of film formation of the metal oxide layer 555.

For example, in the case where the metal oxide layer 555 is formed by the sputtering method, a process gas used in the sputtering remains in the film of the metal oxide layer 555. For example, in the case where Ar is used as the process gas for the sputtering, Ar may remain in the film of the metal oxide layer 555. The remaining Ar can be detected by the SIMS (Secondary Ion Mass Spectrometry) analysis of the metal oxide layer 555.

Heat treatment (oxidation annealing) for supplying oxygen to the oxide semiconductor layer 544 is performed in the state where the gate insulating layer 550 is formed above the oxide semiconductor layer 544 and the metal oxide layer 555 is formed above the gate insulating layer 550 (step S1007).

In the process from the film formation of the oxide semiconductor layer 544 to the film formation of the gate insulating layer 550 above the oxide semiconductor layer 544, many oxygen defects occur on the upper surface and the side surface of the oxide semiconductor layer 544. Oxygen emitted from the base layer 520 is supplied to the upper surface and the side surface of the oxide semiconductor layer 544 by the oxidation annealing, and the oxygen defects inside the oxide semiconductor layer 544 are repaired.

In the above-described oxidation annealing, the oxygen implanted into the gate insulating layer 550 is blocked by the metal oxide layer 555, so that the emission into the atmosphere is suppressed. Therefore, oxygen is efficiently supplied to the oxide semiconductor layer 544 by the oxidation annealing performed in step S1007, and the oxygen defects inside the oxide semiconductor layer 544 are repaired.

Figure 14:
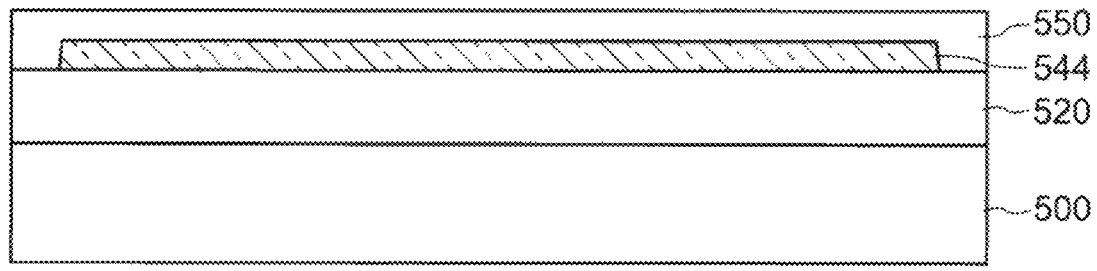
FIG. 14 is a cross-sectional view showing a method for manufacturing a semiconductor device used in a display device according to an embodiment of the present invention.

Next, as shown in FIG. 9 and FIG. 14, after the oxidation annealing, the metal oxide layer 555 is etched (removed) (step S1008). Either wet etching or dry etching may be used when etching the metal oxide layer 555. For example, dilute hydrofluoric acid (DHF) is used as the etchant for wet etching. The metal oxide layer 555 formed on the entire surface of the gate insulating layer 550 is removed by the etching. In other words, the metal oxide layer 555 is removed without using a mask. In other words, the etching performed in step S1008 removes all the metal oxide layer 555 in a region overlapping the oxide semiconductor layer 544 formed in one pattern, at least in a plan view.

Figure 15:
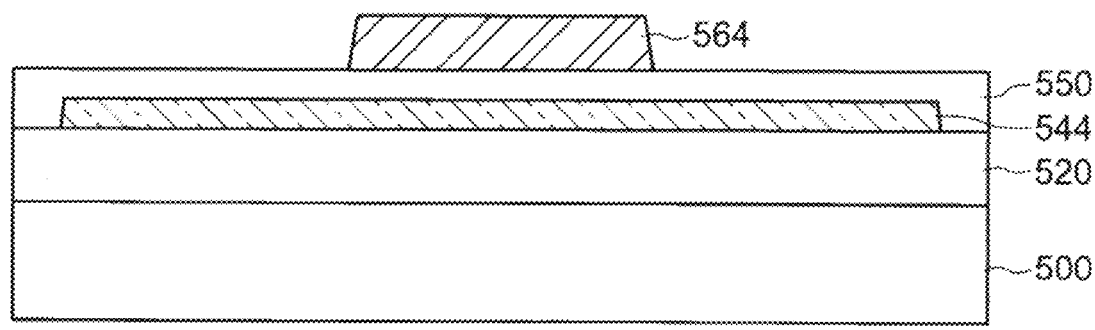
FIG. 15 is a cross-sectional view showing a method for manufacturing a semiconductor device used in a display device according to an embodiment of the present invention.

Next, as shown in FIG. 9 and FIG. 15, the gate electrode 564 is formed above the gate insulating layer 550 (step S1009). The gate electrode 564 is formed by patterning the metal layer formed by the sputtering method or the atomic layer deposition method. As described above, the gate electrode 564 is formed to be in contact with the gate insulating layer 550 exposed by removing the metal oxide layer 555.

A general metal material is used as the material of the gate electrode 564. For example, examples of the metal material include aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and an alloy or compound thereof. In the gate electrode 564, the above-described material may be used in a single-layer structure or a stacked structure.

Figure 16:
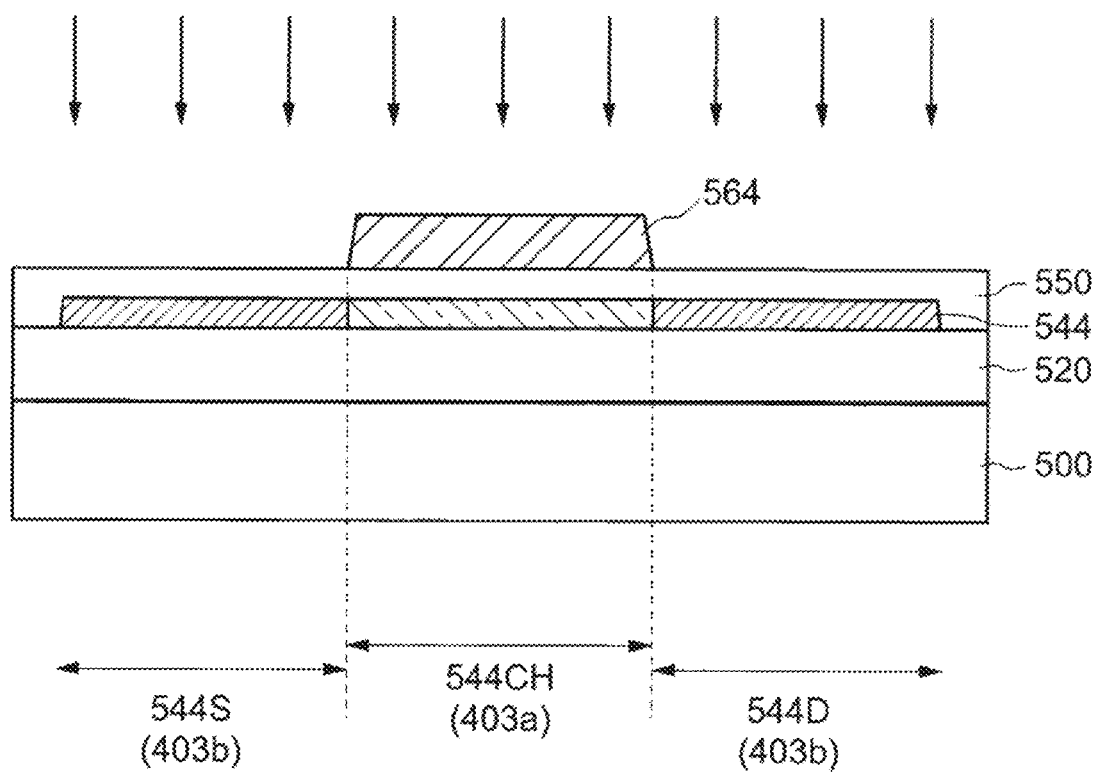
FIG. 16 is a cross-sectional view showing a method for manufacturing a semiconductor device used in a display device according to an embodiment of the present invention.

Next, as shown in FIG. 9 and FIG. 16, with the gate electrode 564 formed, the source region 544S and the drain region 544D of the oxide semiconductor layer 544 are formed (step S1010). Specifically, an impurity element is implanted into the oxide semiconductor layer 544 via the gate insulating layer 550 using the gate electrode 564 as a mask by the ion implantation method or the ion doping method. In step S1010, for example, an impurity element such as argon (Ar), phosphorus (P), or boron (B) is implanted into part of the oxide semiconductor layer 544 not covered with the gate electrode 564.

The region where the impurity element is implanted into the oxide semiconductor layer 544 is reduced in resistance so as to function as a conductive layer by forming an oxygen vacancy. That is, as a result of the impurity element being implanted into the oxide semiconductor layer 544 in step S1010, the conductive portion 403b (the source region 544S and the drain region 544D) are formed in the region not covered with the gate electrode 564. On the other hand, the channel portion 403a (the channel region 544CH) is formed in a region of the oxide semiconductor layer 544 covered with the gate electrode 564. Since the gate electrode 564 functions as a mask, no impurity element is implanted into the channel portion 403a.

In the case where the display device 100 of the present embodiment is manufactured, impurities are implanted into the oxide semiconductor layer 544, and at the same time, impurities are also implanted into the wiring pattern (the wiring pattern formed simultaneously with the oxide semiconductor layer 544 in FIG. 12) composed of the above-described oxide semiconductor layer. This impurity implantation makes the wiring pattern an oxide semiconductor layer having the same sheet resistance or electric conductivity as the conductive portion 403b. That is, the common wiring 204 is formed by the process shown in FIG. 16.

In addition, in the present embodiment, since the impurity element is implanted into the gate insulating layer 550 via the oxide semiconductor layer 544, not only the source region 544S and the drain region 544D but also the gate insulating layer 550 contains the impurity element such as argon (Ar), phosphorus (P), or boron (B).

Figure 17:
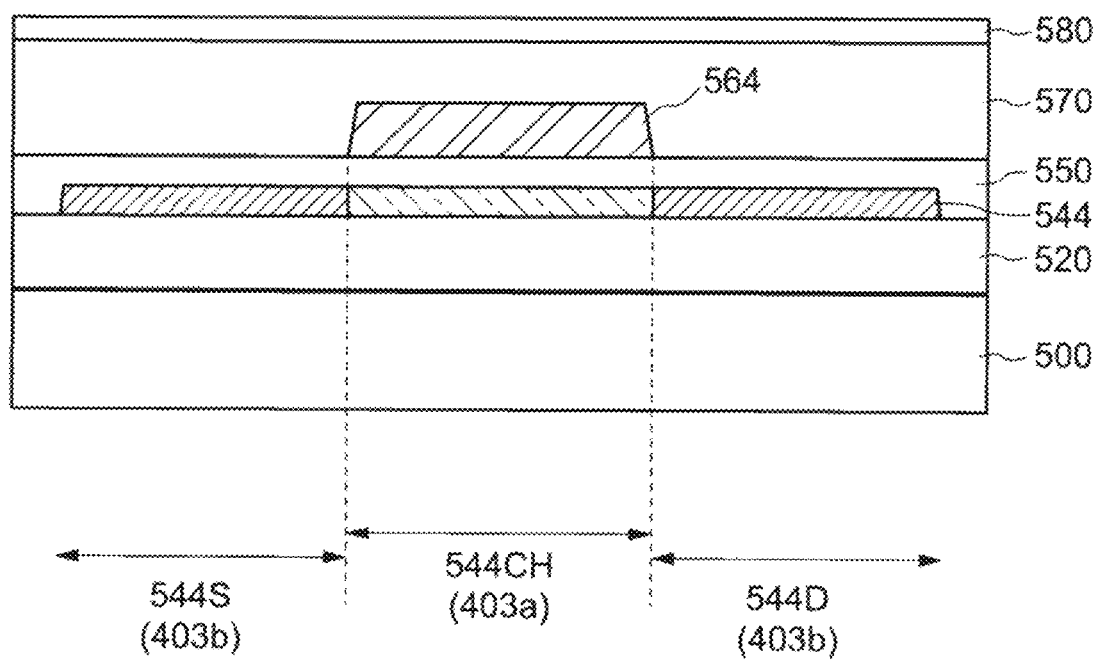
FIG. 17 is a cross-sectional view showing a method for manufacturing a semiconductor device used in a display device according to an embodiment of the present invention.

Next, as shown in FIG. 9 and FIG. 17, the insulating layers 570 and 580 are formed as an interlayer film above the gate insulating layer 550 and the gate electrode 564 (step S1011).

A method for forming the insulating layers 570 and 580 and the insulating materials may be referred to the explanation of the base layer 520. A thickness of the insulating layer 570 is 50 nm or more and 500 nm or less. A thickness of the insulating layer 580 is 50 nm or more and 500 nm or less. In the present embodiment, for example, a silicon nitride layer is formed as the insulating layer 570, and a silicon oxide layer is formed as the insulating layer 580.

Figure 18:
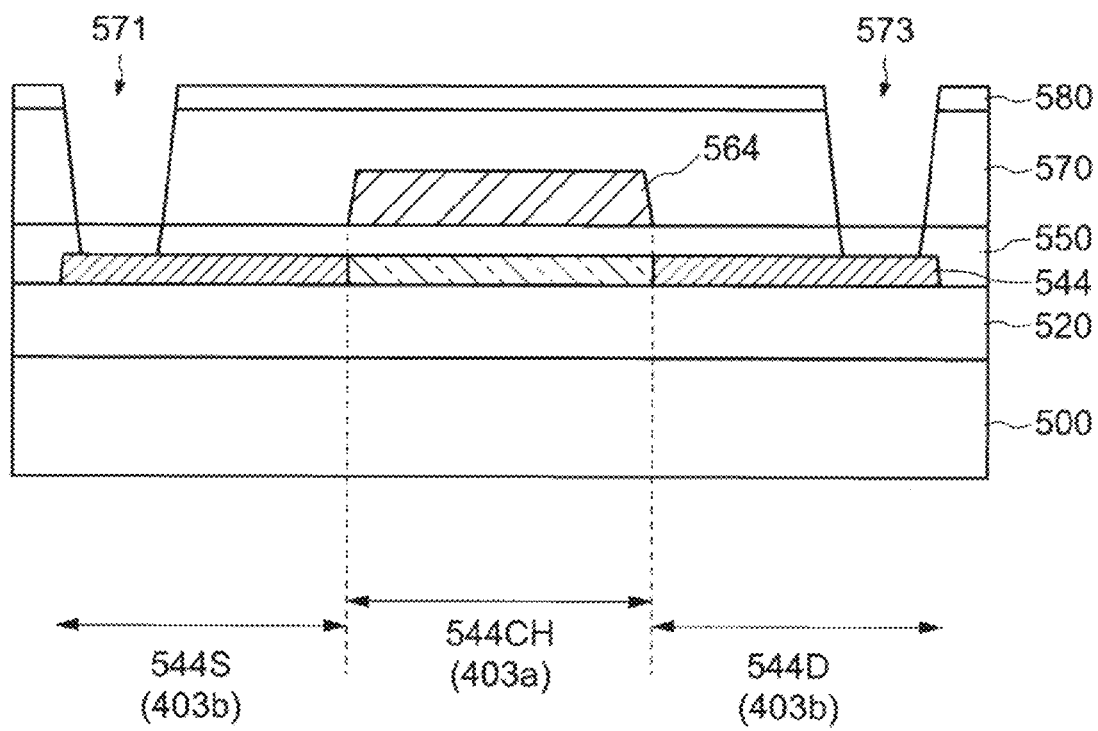
FIG. 18 is a cross-sectional view showing a method for manufacturing a semiconductor device used in a display device according to an embodiment of the present invention.

Next, as shown in FIG. 9 and FIG. 18, the contact holes 571 and 573 are formed in the gate insulating layer 550 and the insulating layers 570 and 580 (step S1012). The source region 544S is exposed by the contact hole 571, and the drain region 544D is exposed by the contact hole 573. When the source region 544S and the drain region 544D are exposed by the contact holes 571 and 573, the source electrode 591 and the drain electrode 593 shown in FIG. 5 are formed (step S1013). The semiconductor device 10 shown in FIG. 5 is completed through the above-described processes.

For example, the source electrode 591 and the drain electrode 593 are formed by the sputtering method. The source electrode 591 and the drain electrode 593 can be formed using a general metal material. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and an alloy or compound thereof can be used as the metal material. The source electrode 591 and the drain electrode 593 may have a single-layer structure or a stacked structure.

In the semiconductor device 10 manufactured by the above-described manufacturing method, electric properties (specifically, field-effect mobility) with a mobility of 30 $cm^2/Vs$ or more, 35 $cm^2/Vs$ or more, or 40 $cm^2/Vs$ or more can be obtained in a range in which a channel length L of the channel region 544CH is 2 μm or more and 4 μm or less and a channel width of the channel region 544CH is 2 μm or more and 25 μm or less. The field-effect mobility in the present embodiment is a field-effect mobility in a saturated region of the semiconductor device 10, it means the maximum value of the field-effect mobility in a region in which a potential difference (Vd) between the source electrode and the drain electrode is larger than a value (Vg–Vth) obtained by subtracting a threshold voltage (Vth) of the semiconductor device 10 from a voltage (Vg) supplied to the gate electrode.

In the semiconductor device 10 of the present embodiment, a resistance value of the conductive portion 403b constituting the source region 544S and the drain region 544D is sufficiently low. Therefore, an oxide semiconductor layer composed of the same layer as the conductive portion 403b can be used as a wiring (specifically, the common wiring 204). Since the oxide semiconductor has light transmittance, if the oxide semiconductor can be used as the wiring material as in the present embodiment, it is very advantageous to improve the aperture ratio of the display portion 110 in the display device 100.

Second Embodiment

In the present embodiment, a semiconductor device 10a having a configuration different from the configuration of the semiconductor device 10 described in the first embodiment will be described.

The configuration of the semiconductor device 10a is similar to that of the semiconductor device 10 of the first embodiment, but is different from that of the semiconductor device 10 of the first embodiment in that a metal oxide layer 530 is arranged between the base layer 520 and the oxide semiconductor layer 544. In the following description, the same configuration as in the first embodiment will be omitted, and differences from the first embodiment will be mainly described.

Figure 19:
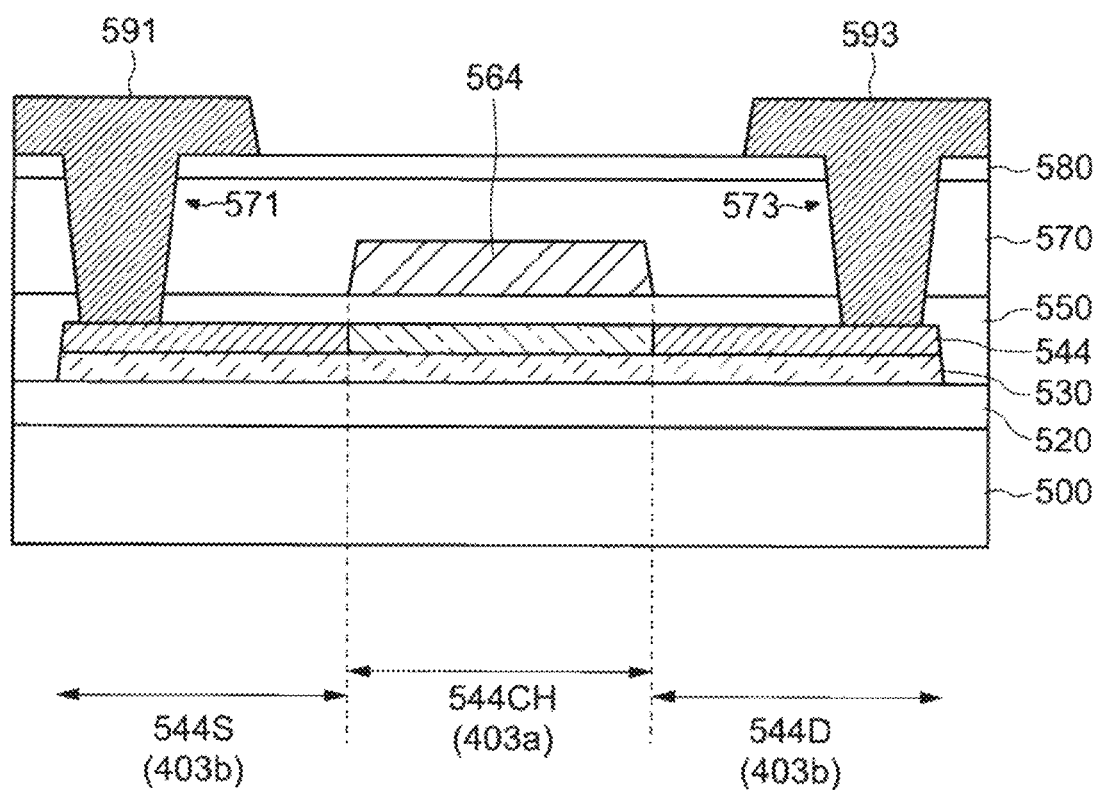
FIG. 19 is a cross-sectional view showing a configuration of a semiconductor device used in a display device according to an embodiment of the present invention.

FIG. 19 is a cross-sectional view showing the configuration of the semiconductor device 10a used in the display device 100 according to an embodiment of the present invention. As shown in FIG. 19, the semiconductor device 10a includes the base layer 520, the metal oxide layer 530, the oxide semiconductor layer 544, the gate insulating layer 550, the gate electrode 564, the insulating layer 570, the insulating layer 580, the source electrode 591, and the drain electrode 593.

The metal oxide layer 530 is arranged above the base layer 520. The metal oxide layer 530 is in contact with the base layer 520. The oxide semiconductor layer 544 is arranged above the metal oxide layer 530. The lower surface of the oxide semiconductor layer 544 is in contact with the metal oxide layer 530. In the present embodiment, an end portion of the metal oxide layer 530 and an end portion of the oxide semiconductor layer 544 substantially coincide with each other.

The metal oxide layer 530 is a layer containing a metal oxide containing aluminum as the main component in the same manner as the metal oxide layer 555 (see FIG. 13), and has a function as a gas barrier film for shielding a gas such as oxygen or hydrogen. A material similar to that of the metal oxide layer 555 can be used as the metal oxide layer 530, but a different material may be used.

Although a plane shape of the semiconductor device 10a is similar to that of FIG. 6, a plane pattern of the metal oxide layer 530 in a plan view is substantially the same as a plane pattern of the oxide semiconductor layer 544. Referring to FIG. 19, the lower surface of the oxide semiconductor layer 544 is covered with the metal oxide layer 530. In particular, in the present embodiment, all of the lower surface of the oxide semiconductor layer 544 is covered with the metal oxide layer 530.

Since the ratio of indium in the oxide semiconductor layer 544 is 50% or more, the semiconductor device 10a with high mobility can be realized. On the other hand, in such the oxide semiconductor layer 544, oxygen contained in the oxide semiconductor layer 544 is easily reduced, and oxygen defects are easily formed in the oxide semiconductor layer 544.

In a top-gate structure such as the semiconductor device 10a, hydrogen is released from a layer (for example, the base layer 520) arranged closer to the substrate 500 than the oxide semiconductor layer 544 in a heat treatment step of the manufacturing process. When the hydrogen released from the lower layer reaches the oxide semiconductor layer 544, oxygen defects may be generated in the oxide semiconductor layer 544. The generation of oxygen defects is more significant as the pattern size of the oxide semiconductor layer 544 increases. In order to suppress the generation of such oxygen defects, it is preferable to suppress hydrogen from reaching the lower surface of the oxide semiconductor layer 544.

In addition, the upper surface of the oxide semiconductor layer 544 is affected by a process (for example, a patterning process or an etching process) after the oxide semiconductor layer 544 is formed. On the other hand, the lower surface of the oxide semiconductor layer 544 is not affected as described above. Therefore, the amount of oxygen defects formed on the upper surface of the oxide semiconductor layer 544 is greater than the amount of oxygen defects formed on the lower surface of the oxide semiconductor layer 544. That is, the oxygen defects inside the oxide semiconductor layer 544 are not present in a uniform distribution in the thickness direction of the oxide semiconductor layer 544 but in a non-uniform distribution in the thickness direction of the oxide semiconductor layer 544. Specifically, the amount of oxygen defects inside the oxide semiconductor layer 544 decreases on the lower surface side of the oxide semiconductor layer 544 and increases on the upper surface side of the oxide semiconductor layer 544.

When an amount of oxygens required for repairing the oxygen defects formed on the upper surface side of the oxide semiconductor layer 544 is supplied to the oxide semiconductor layer 544 in which the oxygen defects are distributed as described above, oxygen is excessively supplied to the lower surface side of the oxide semiconductor layer 544. As a result, on the lower surface side, a defect level different from the oxygen defects may be formed due to excess oxygen, and there is a possibility that a phenomenon such as a characteristic variation in a reliability test or a decrease in field-effect mobility may occur. Therefore, in order to suppress such a phenomenon, it is desirable to supply oxygen to the upper surface side of the oxide semiconductor layer 544 while suppressing oxygen supply to the lower surface side of the oxide semiconductor layer 544.

As described above, in the configuration and the manufacturing method of the first embodiment, even if the initial characteristics of the semiconductor device are improved by the oxygen-supplying process to the oxide semiconductor layer, there is a possibility that the characteristic variation due to the reliability test may occur. That is, there is a trade-off between the initial characteristics and the reliability test. However, according to the present embodiment, arranging the metal oxide layer 530 on the lower surface of the oxide semiconductor layer 544 makes it possible to obtain a good initial property and reliability test of the semiconductor device 10a.

Figure 20:
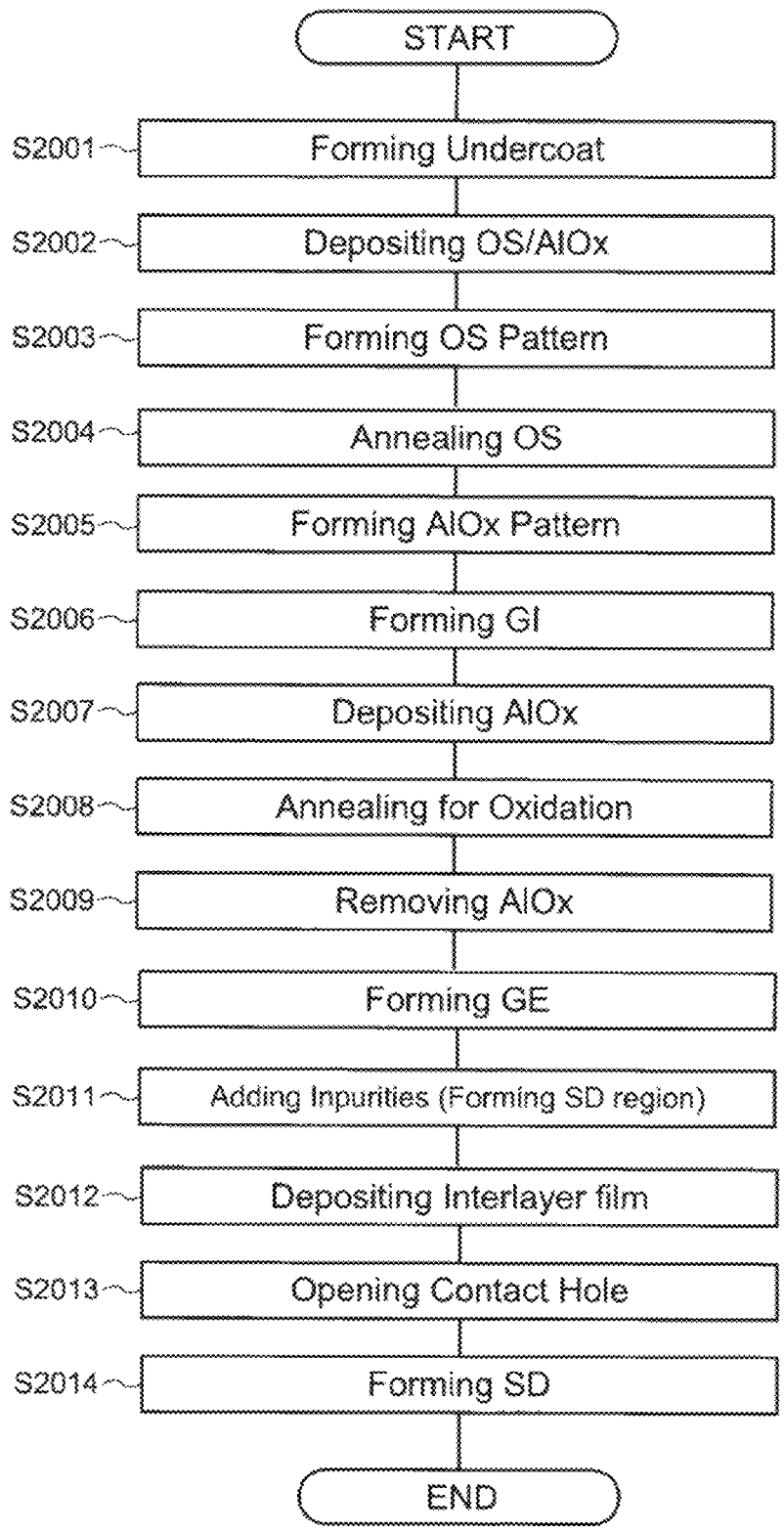
FIG. 20 is a sequence diagram showing a method for manufacturing a semiconductor device used in a display device according to an embodiment of the present invention.
Figure 21:
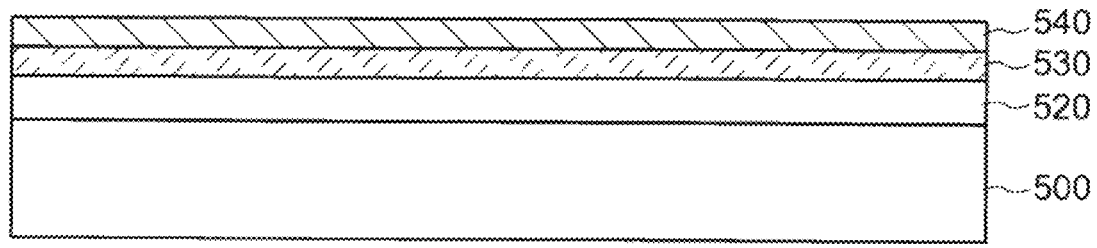
FIG. 21 is a cross-sectional view showing a method for manufacturing a semiconductor device used in a display device according to an embodiment of the present invention.
Figure 22:
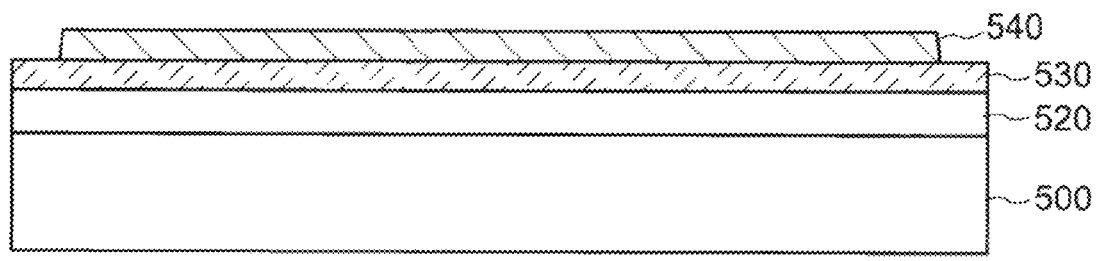
FIG. 22 is a cross-sectional view showing a method for manufacturing a semiconductor device used in a display device according to an embodiment of the present invention.
Figure 23:
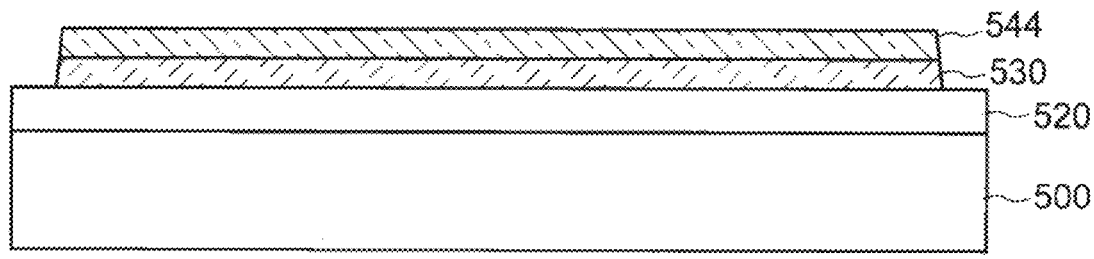
FIG. 23 is a cross-sectional view showing a method for manufacturing a semiconductor device used in a display device according to an embodiment of the present invention.

A method for manufacturing the semiconductor device 10a used in the display device 100 according to an embodiment of the present invention will be described with reference to FIG. to FIG. 23. FIG. 20 is a sequence diagram showing the method for manufacturing the semiconductor device 10a used in the display device 100 according to an embodiment of the present invention. FIG. 21 to FIG. 23 are cross-sectional views showing the method for manufacturing the semiconductor device 10a used in the display device 100 according to an embodiment of the present invention.

As shown in FIG. 20, the base layer 520 is formed above the substrate 500 (step S2001). Step S2001 may be refer to the explanation of step S1001 shown in FIG. 9 and FIG. 10. In the present embodiment, silicon nitride and silicon oxide are used for the material of the base layer 520. Silicon oxide is preferred for reducing oxygen defects in the oxide semiconductor layer 544 because it releases oxygen by heat treatment.

As shown in FIG. 20 and FIG. 21, the metal oxide layer 530 and the oxide semiconductor layer 540 are formed above the base layer 520 (step S2002). The metal oxide layer 530 and the oxide semiconductor layer 540 are formed by the sputtering method or the atomic layer deposition method (ALD).

The material of the metal oxide layer 530 may be referred to the description of the material of the metal oxide layer 555 shown in FIG. 13. For example, the thickness of the metal oxide layer 530 is 1 nm or more and 100 nm or less, 1 nm or more and 50 nm or less, 1 nm or more and 30 nm or less, or 1 nm or more and 10 nm or less. In the present embodiment, aluminum oxide is used as the metal oxide layer 530. Aluminum oxide has a high barrier property against gas. In the present embodiment, the aluminum oxide used as the metal oxide layer 530 blocks hydrogen and oxygen released from the base layer 520 and suppress the released hydrogen and oxygen from reaching the oxide semiconductor layer 540.

For example, the thickness of the oxide semiconductor layer 540 is 10 nm or more and 100 nm or less, 15 nm or more and 70 nm or less, or 20 nm or more and 40 nm or less. In the present embodiment, an oxide containing indium (In) and gallium (Ga) is used as the oxide semiconductor layer 540. The oxide semiconductor layer 540 before the OS annealing performed in step S2004 described below is amorphous.

In the case where the oxide semiconductor layer 540 is crystallized by the OS annealing described later, the oxide semiconductor layer 540 after the film formation and before the OS annealing is preferably amorphous (a state in which crystalline components of the oxide semiconductor are zero or small). The film forming method in which the oxide semiconductor layer 540 after the film formation is amorphous may be refer to the explanation of step S1002 shown in FIG. 9.

Next, as shown in FIG. 20 and FIG. 22, a pattern of the oxide semiconductor layer 540 is formed (step S2003). Although not shown, a resist mask is formed above the oxide semiconductor layer 540, and the oxide semiconductor layer 540 is etched using the resist mask. Either wet etching or dry etching may be used when etching the oxide semiconductor layer 540. The wet etching can be performed using an acidic etchant. For example, oxalic acid or hydrofluoric acid can be used as the acidic etchant.

Next, as shown in FIG. 20, heat treatment (OS annealing) is performed on the oxide semiconductor layer 540 (step S2004) after the formation of the pattern of the oxide semiconductor layer 540. In the present embodiment, the oxide semiconductor layer 540 is crystallized by the OS annealing. In addition, the crystallized oxide semiconductor layer is referred to as the oxide semiconductor layer 544.

Next, as shown in FIG. 20 and FIG. 23, a pattern of the metal oxide layer 530 is formed (step S2005). The metal oxide layer 530 is etched using the crystallized oxide semiconductor layer 544 as a mask. Either wet etching or dry etching may be used when etching the metal oxide layer 530. For example, dilute hydrofluoric acid (DHF) is used as the etchant for wet etching. The crystallized oxide semiconductor layer 544 has etching resistance to dilute hydrofluoric acid as compared to the amorphous oxide semiconductor layer 540. Therefore, the metal oxide layer 530 can be etched in a self-aligned manner using the oxide semiconductor layer 544 as a mask. As a result, a photolithography step can be omitted.

Since step S2006 to step S2014 shown in FIG. 20 are the same as step S1005 to step S1013 shown in FIG. 9, the following explanation will be omitted. The semiconductor device 10a shown in FIG. 19 can be formed by passing through step S2006 to step S2014.

In the semiconductor device 10a manufactured by the above-described manufacturing method, electric properties (specifically, field-effect mobility) with a mobility of 50 $cm^2/Vs$ or more, 55 $cm^2/Vs$ or more, or 60 $cm^2/Vs$ or more can be obtained in a range in which the channel length L of the channel region 544CH is 2 μm or more and 4 μm or less and the channel width of the channel region 544CH is 2 μm or more and 25 μm or less. The definition of the field-effect mobility in the present embodiment is the same as that in the first embodiment.

Third Embodiment

In the present embodiment, a semiconductor device manufactured by a method different from the second embodiment will be described. Since a structure of the semiconductor device of the present embodiment is the same as that of the semiconductor device 10a described in the second embodiment, it will be described as the semiconductor device 10a in the following description. The present embodiment will be described focusing on a point different from the second embodiment.

Figure 24:
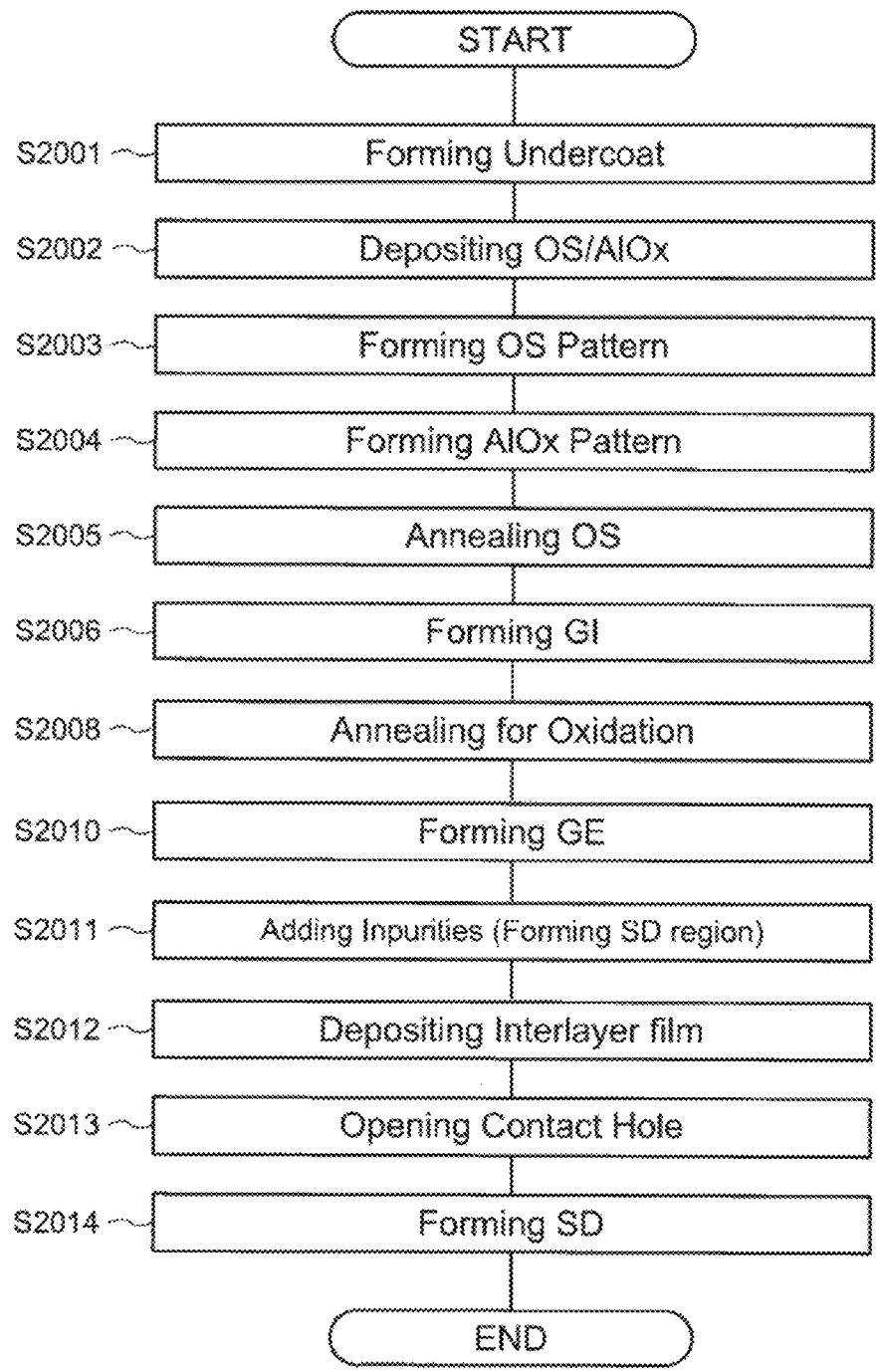
FIG. 24 is a sequence diagram showing a method for manufacturing a semiconductor device used in a display device according to an embodiment of the present invention.

FIG. 24 is a sequence diagram showing a method for manufacturing the semiconductor device 10a used in the display device 100 according to an embodiment of the present invention. As shown in FIG. 24, in the present embodiment, two steps of step S2007 and step S2009 shown in FIG. 20 are omitted. That is, in the present embodiment, after the gate insulating layer 550 is formed, oxidation annealing (step S2008) is performed as it is. Oxidation annealing supplies oxygen released from the gate insulating layer 550 to the oxide semiconductor layer 540 and repairs oxygen defects contained in the oxide semiconductor layer 540. Since the role of the metal oxide layer 530 in this case is the same as that of the second embodiment, the description thereof will be omitted.

In the semiconductor device 10a manufactured by the manufacturing method of the present embodiment, electric properties (specifically, field-effect mobility) with a mobility of 30 $cm^2/Vs$ or more, 35 $cm^2/Vs$ or more, or 40 $cm^2/Vs$ or more can be obtained in a range in which the channel length L of the channel region 544CH is 2 μm or more and 4 μm or less and the channel width of the channel region 544CH is 2 μm or more and 25 μm or less. The definition of the field-effect mobility in the present embodiment is the same as that in the first embodiment.

Fourth Embodiment

In the present embodiment, a semiconductor device manufactured in a method different from that of the first embodiment will be described. Since a structure of the semiconductor device of the present embodiment is the same as that of the semiconductor device 10 described in the first embodiment, it will be described as the semiconductor device 10 in the following description. The present embodiment will be described focusing on a point different from the first embodiment.

Figure 25:
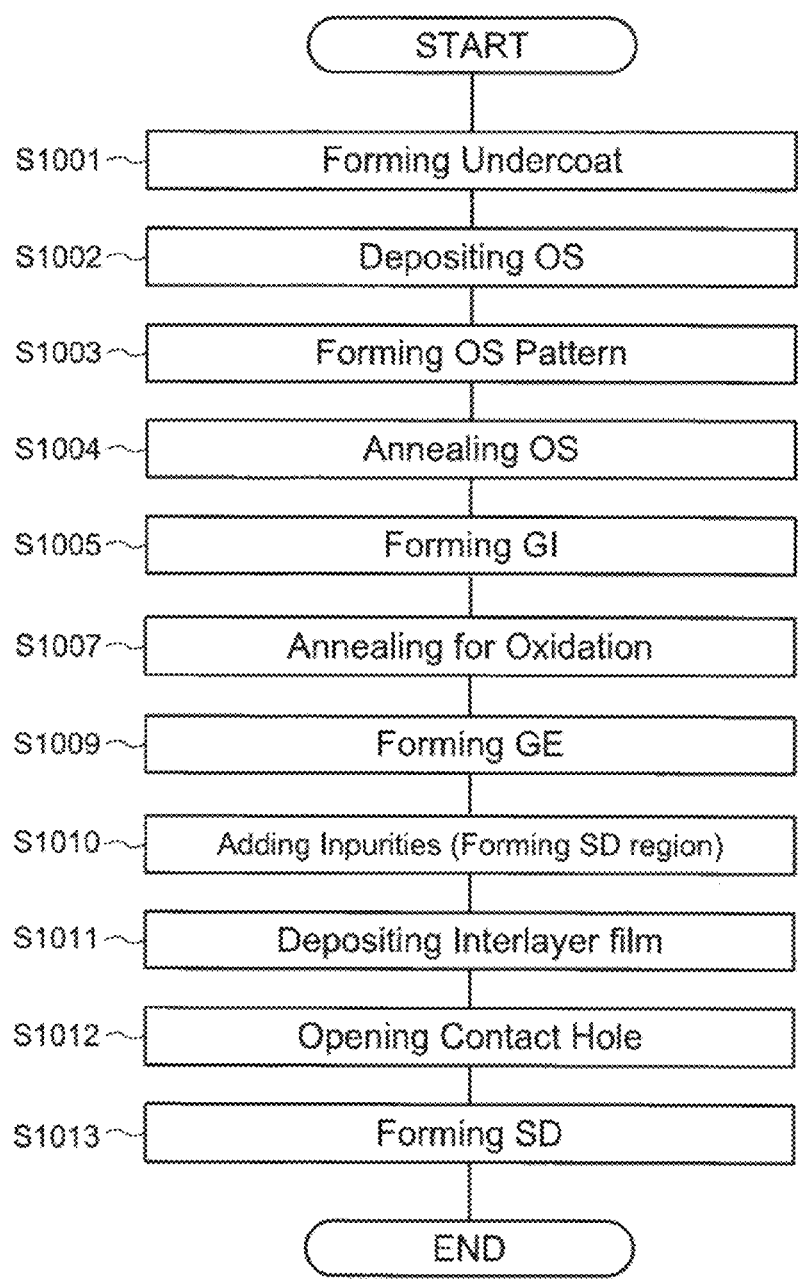
FIG. 25 is a sequence diagram showing a method for manufacturing a semiconductor device used in a display device according to an embodiment of the present invention.

FIG. 25 is a sequence diagram showing a method for manufacturing the semiconductor device 10 used in the display device 100 according to an embodiment of the present invention. As shown in FIG. 25, in the present embodiment, two steps of step S1006 and step S1008 shown in FIG. 9 are omitted. That is, in the present embodiment, after the gate insulating layer 550 is formed, oxidation annealing (step S1007) is performed as it is. Oxidation annealing supplies the oxygen released from the gate insulating layer 550 to the oxide semiconductor layer 544 and repairs oxygen defects contained in the oxide semiconductor layer 544.

Fifth Embodiment

In the first embodiment, although an example in which the common electrode 205 is arranged above the pixel electrode 620 is shown, in the present embodiment, the positional relationship between the pixel electrode 620 and the common electrode 205 may be reversed. That is, the pixel electrode 620 may be arranged above the common electrode 205. In the present embodiment, configurations different from those of the first embodiment will be described, and the same configurations will be illustrated using the same reference signs, and description thereof will be omitted.

Figure 26:
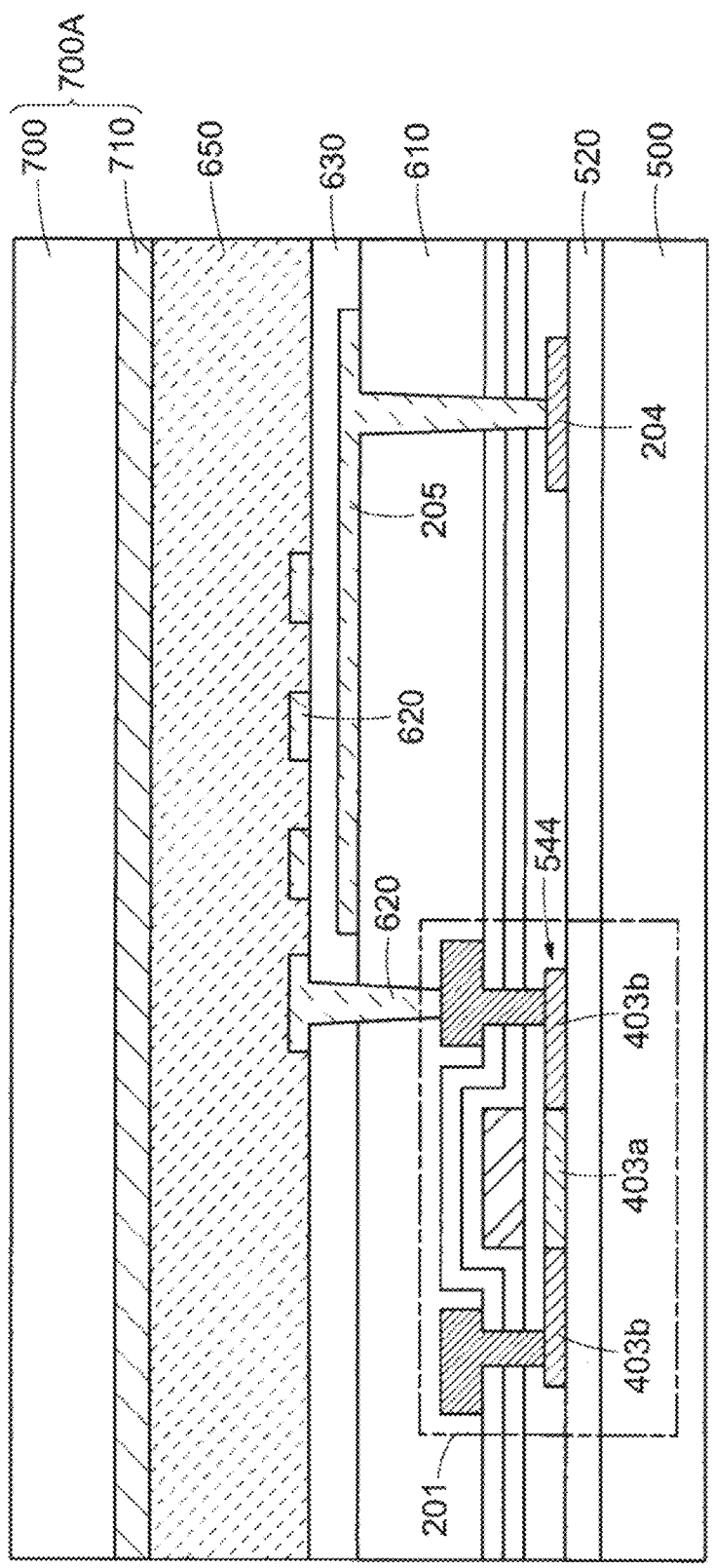
FIG. 26 is a cross-sectional view showing a structure of a pixel in a display device according to an embodiment of the present invention.

FIG. 26 is a cross-sectional view showing the structure of the pixel 112 in the display device 100 according to an embodiment of the present invention. As shown in FIG. 26, in the present embodiment, the common electrode 205 is arranged above the planarization layer 610. In addition, the pixel electrode 620 is arranged above the common electrode 205 via the insulating layer 630. Also in the present embodiment, orientation control of the liquid crystal molecules of the liquid crystal layer 650 is performed by the fringe electric field formed between the pixel electrode 620 and the common electrode 205.

Sixth Embodiment

In the first embodiment, although an example in which the structure of the select transistor 201 is the top-gate structure has been described, the structure of the select transistor 201 is not limited to the top-gate structure. In the present embodiment, an example in which the structure of the select transistor arranged in the pixel 112 is a dual-gate structure will be described. In the present embodiment, configurations different from those of the first embodiment will be described, and the same configurations will be illustrated using the same reference signs, and description thereof will be omitted.

Figure 27:
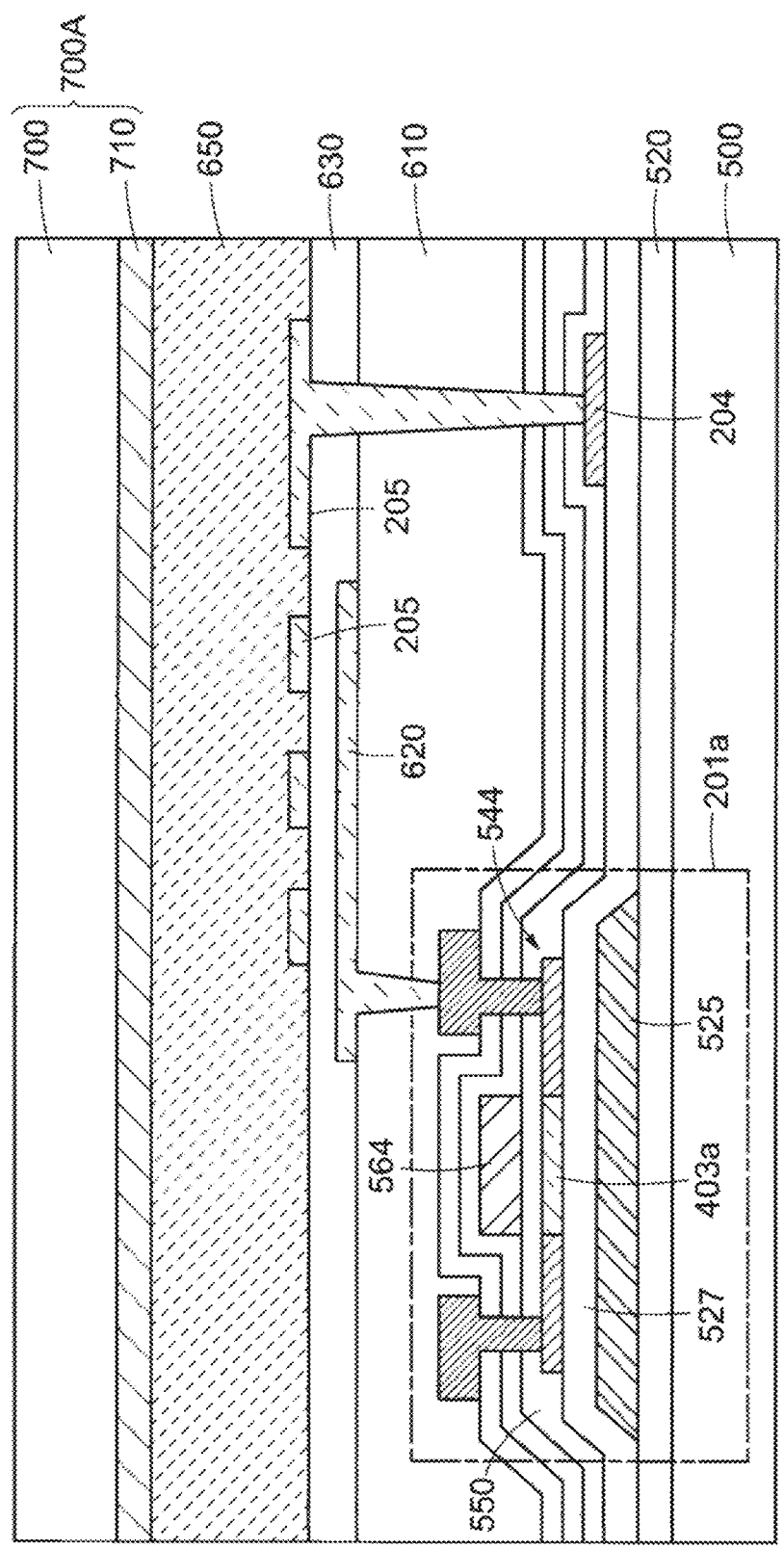
FIG. 27 is a cross-sectional view showing a structure of a pixel in a display device according to an embodiment of the present invention.

FIG. 27 is a cross-sectional view showing the structure of the pixel 112 in the display device 100 according to an embodiment of the present invention. As shown in FIG. 27, in the present embodiment, a gate electrode 525 is arranged above the base layer 520. The gate electrode 525 has a function as a bottom gate in a select transistor 201b of the present embodiment. The material constituting the gate electrode 525 may be the same as or different from the material of the gate electrode 564. However, the material of the gate electrode 525 is preferably a material that withstands the temperature of the process of crystallizing the oxide semiconductor layer 544 (S1004: OS annealing shown in FIG. 9).

A gate insulating layer 527 is arranged above the gate electrode 525. The gate electrode 525 and the oxide semiconductor layer 544 face each other via the gate insulating layer 527. The material constituting the gate insulating layer 550 can be used as a material constituting the gate insulating layer 527. In the present embodiment, a silicon oxide layer is used as the gate insulating layer 527.

In the case where a select transistor 201a has the dual-gate structure as in the present embodiment, the gate electrode 525 also functions as a light-shielding film. That is, the gate electrode 525 also has a function of blocking the light from the substrate 500 toward the channel portion 403a of the oxide semiconductor layer 544. Therefore, the select transistor 201a of the present embodiment has an advantage that the off-state current is lower than that of the select transistor 201 of the first embodiment. In addition, since the gate voltage is applied from above and below to the channel portion 403a of the oxide semiconductor layer 544, an increase in the on-state current is expected.

Seventh Embodiment

In the first embodiment, although an example in which the select transistor 201 has the top-gate structure has been described, in the present embodiment, an example in which the select transistor arranged in the pixel 112 has the bottom-gate structure will be described. In the present embodiment, configurations different from those of the first embodiment will be described, and the same configurations will be illustrated using the same reference signs, and description thereof will be omitted.

Figure 28:
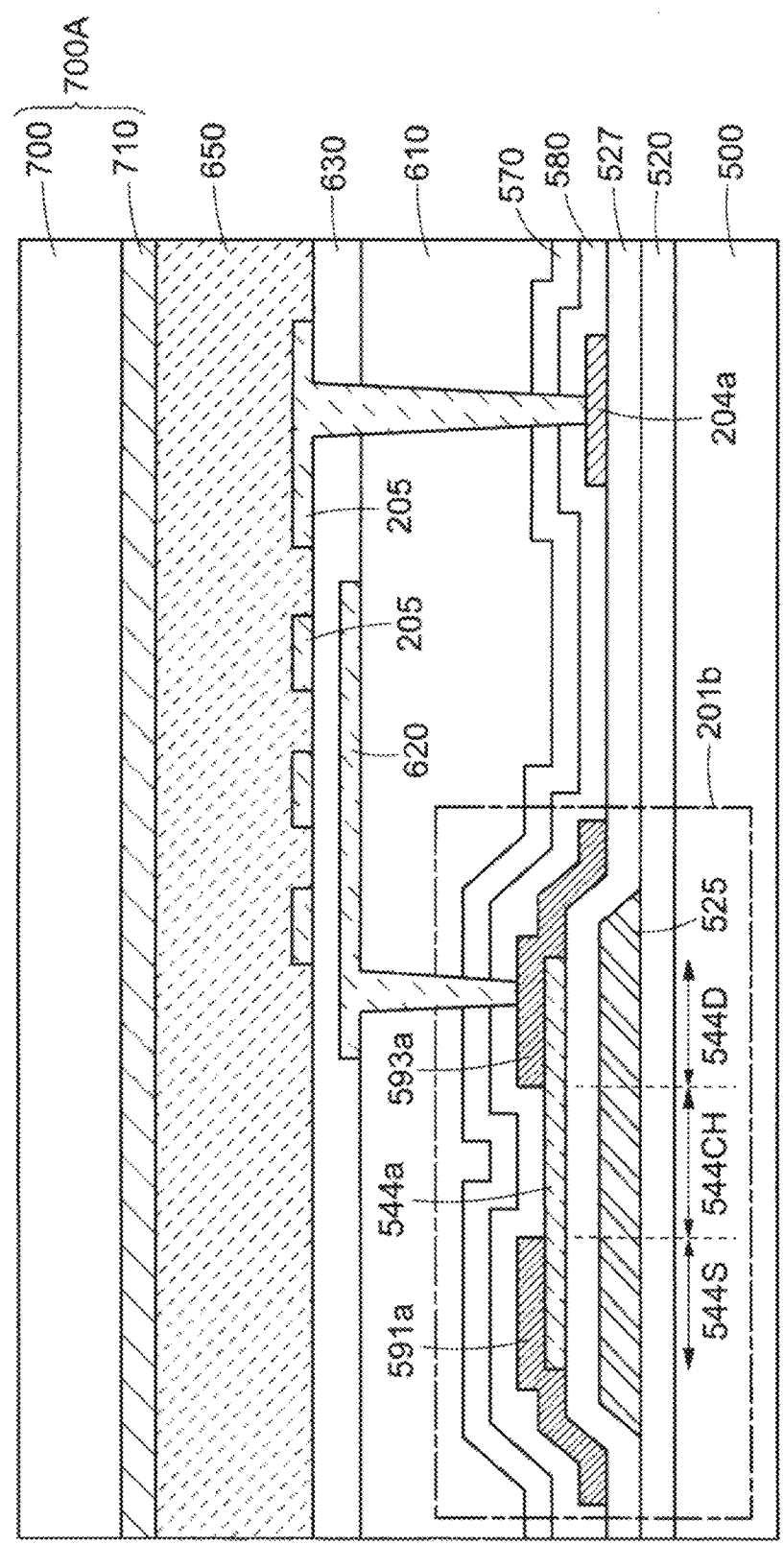
FIG. 28 is a cross-sectional view showing a structure of a pixel in a display device according to an embodiment of the present invention.

FIG. 28 is a cross-sectional view showing the structure of the pixel 112 in the display device 100 according to an embodiment of the present invention. As shown in FIG. 28, in the select transistor 201b of the present embodiment, the gate electrode 525 and the gate insulating layer 527 are arranged above the base layer 520. The gate electrode 525 and the gate insulating layer 527 are as described in the sixth embodiment (see FIG. 27).

An oxide semiconductor layer 544a is arranged above the gate insulating layer 527. A source electrode 591a and a drain electrode 593a are arranged above the oxide semiconductor layer 544 at positions corresponding to the source region 544S and the drain region 544D, respectively. A region of the oxide semiconductor layer 544a where the source electrode 591a and the drain electrode 593a are not arranged functions as the channel region 544CH. In the select transistor 201b of the present embodiment, the source electrode 591a and the drain electrode 593a are arranged so as to be in direct contact with the oxide semiconductor layer 544a.

The insulating layers 570 and 580 are arranged above the source electrode 591a and the drain electrode 593a. In the present embodiment, as opposed to the first embodiment, the insulating layer 580 and the insulating layer 570 are arranged in this order from the lower layer. That is, the insulating layer 580 made of silicon oxide is in contact with the channel region 544CH of the oxide semiconductor layer 544a. With such a configuration, when the same heat treatment as that of the oxidation annealing (S1007) shown in FIG. 9 is performed, oxygen is supplied from the insulating layer 580 to the channel region 544CH of the oxide semiconductor layer 544a, so that the oxygen defects inside the channel region 544CH can be repaired.

Since the same heat treatment as the OS annealing (S1004) shown in FIG. 9 is performed on the oxide semiconductor layer 544a, it has a polycrystalline structure similar to the first embodiment. However, the source region 544S and the drain region 544D can be reduced in resistance by oxygen defects formed in the oxide semiconductor layer 544a when the source electrode 591a and the drain electrode 593a are formed.

The common wiring 204a is composed of the same layer as the oxide semiconductor layer 544a, but is formed in the same process as the channel region 544CH. Therefore, it is desirable to separately add a process for reducing resistance of the common wiring 204a. In an example shown in FIG. 28, a wiring pattern composed of the oxide semiconductor layer used as the common wiring 204a is formed, and then impurities are added to the wiring pattern by ion-implantation or the like. Therefore, the common wiring 204a has the same electric conductivity as that of the conductive portion 403b in the oxide semiconductor layer 544 of the first embodiment.

Figure 29:
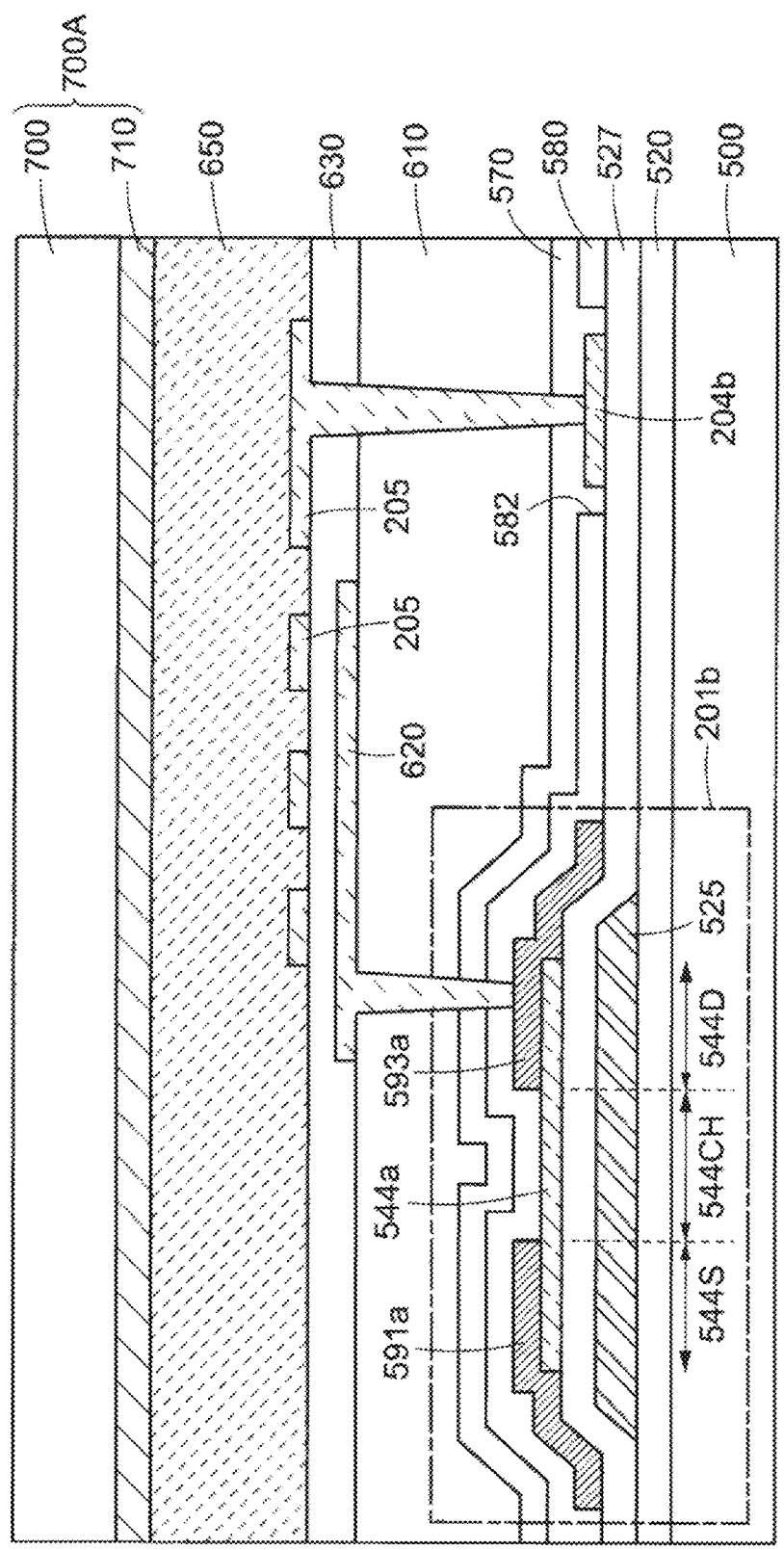
FIG. 29 is a cross-sectional view showing a structure of a pixel in a display device according to an embodiment of the present invention.

FIG. 29 is a cross-sectional view showing the structure of the pixel 112 in the display device 100 according to an embodiment of the present invention. Specifically, FIG. 29 shows an example in which the common wiring 204b is reduced in resistance by intentionally introducing hydrogen.

In the example shown in FIG. 29, an opening 582 is arranged in the insulating layer 580 so as to expose the wiring pattern (not shown) composed of the oxide semiconductor layer after the insulating layer 580 composed of silicon oxide is formed. When the insulating layer 570 composed of silicon nitride is formed after the opening 582 is formed, the above-described wiring pattern is covered with the insulating layer 570. Hydrogen contained in the silicon nitride diffuses into the oxide semiconductor layer when the wiring pattern composed of the oxide semiconductor layer and the insulating layer 570 are in contact with each other through the heat treatment process. The oxide semiconductor layer is reduced in resistance because hydrogen diffused into the oxide semiconductor layer combines with oxygen defects and functions as a donor.

As described above, in the example shown in FIG. 29, the insulating layer 570 composed of silicon nitride is contacted with the wiring pattern used as the common wiring 204b, and hydrogen is intentionally introduced into the oxide semiconductor layer. Since the wiring pattern composed of the oxide semiconductor layer is sufficiently low in resistance due to the introduction of hydrogen, the oxide semiconductor layer composed of the same layer as the oxide semiconductor layer 544a can be used as the common wiring 204b.

Eighth Embodiment

In the first embodiment, the liquid crystal display device is used as an example of the display device 100, but in the present embodiment, an example in which the present invention is applied to an organic EL display device will be described. In the present embodiment, configurations different from those of the first embodiment will be described, and the same configurations will be illustrated using the same reference signs, and description thereof will be omitted.

Figure 30:
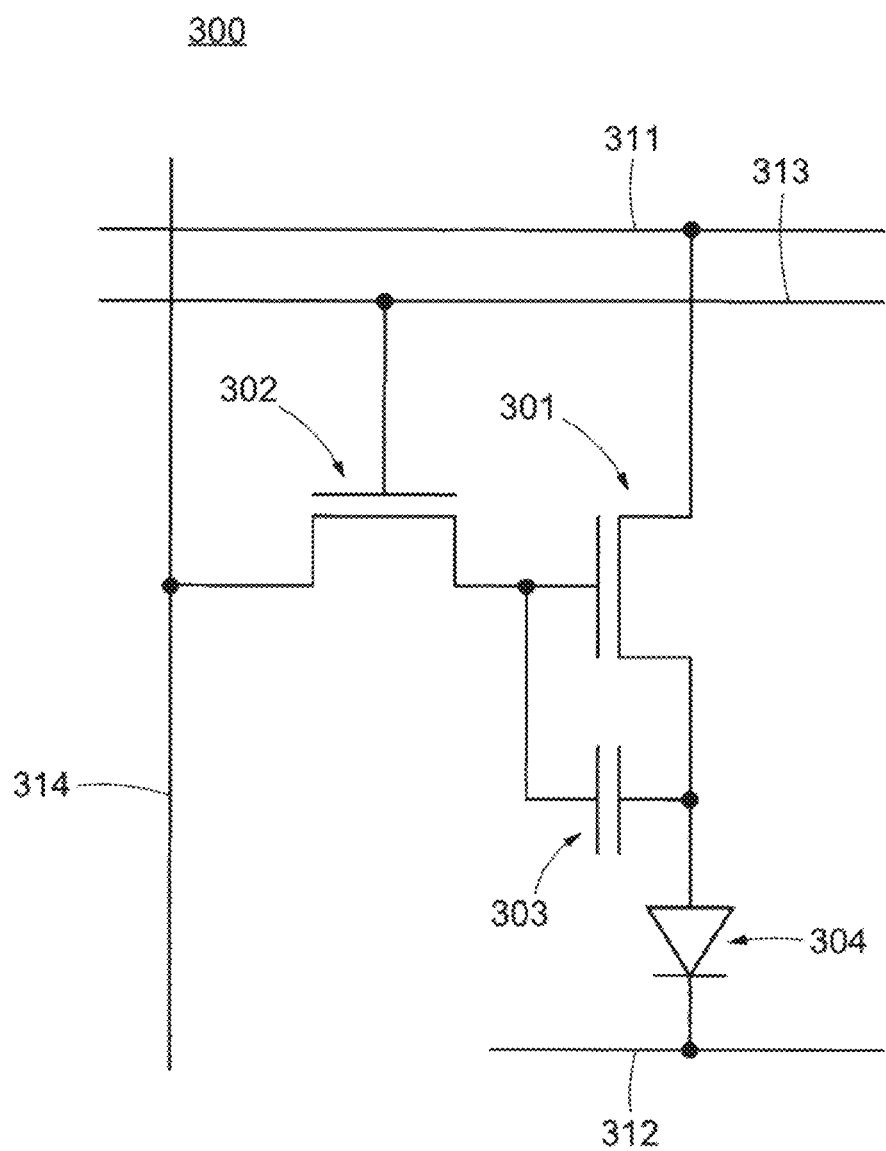
FIG. 30 is a diagram showing a configuration of a pixel circuit in a display device according to and embodiment of the present invention.

FIG. 30 is a diagram showing a configuration of a pixel circuit 300 in the display device according to an embodiment of the present invention. The pixel circuit 300 is a circuit for controlling light emission of each pixel 112 (see FIG. 1). In the example shown in FIG. 30, although a basic configuration using two semiconductor devices is exemplified for convenience of explanation, the present invention is not limited to this example.

As shown in FIG. 30, the pixel circuit 300 of the present embodiment includes a drive transistor 301, a select transistor 302, a holding capacity 303, and a light-emitting element 304. The drive transistor 301 and the select transistor 302 are composed of a semiconductor device (specifically, a thin film transistor) using the oxide semiconductor layer.

A source of the drive transistor 301 is connected to an anode power line 311, and the drive transistor 301 is connected to one end (anode) of the light-emitting element 304. The other end (cathode) of the light-emitting element 304 is connected to a common wiring 312. That is, in the present embodiment, the common wiring 312 functions as a cathode power line in the display period, and the common wiring 312 functions as a wiring for extracting the detection signal of the touch sensor in the sensing period. In the present embodiment, a power-supply voltage higher than the common wiring 312 is applied to the anode power line 311.

A gate of the select transistor 302 is connected to a scanning signal line 313 and a source of the select transistor 302 is connected to a video signal line 314. A drain of the select transistor 302 is connected to a gate of the drive transistor 301. The source and drain of the select transistor 302 may be switched depending on the relation between the voltage applied to the video signal line 314 and the voltage stored in the holding capacity 303.

The holding capacity 303 is connected to the gate and the drain of the drive transistor 301 and the drain of the select transistor 302. A gradation signal that determines the emission intensity of the light-emitting element 304 is supplied to the video signal line 314. A scan signal for selecting a pixel to which the gradation signal is written is supplied to the scanning signal line 313.

In the above-described pixel circuit 300, the gradation signal (gradation voltage) input from the video signal line 314 via the select transistor 302 is held in the holding capacity 303. In the display period (light emission period), a current corresponding to the voltage held in the holding capacity 303 flows from the anode power line 311 toward the light-emitting element 304 via the drive transistor 301. In the present embodiment, the light-emitting element 304 is an organic EL element. The light-emitting element 304 emits light with a brightness corresponding to the amount of current flowing between the anode electrode and the cathode electrode.

Figure 31:
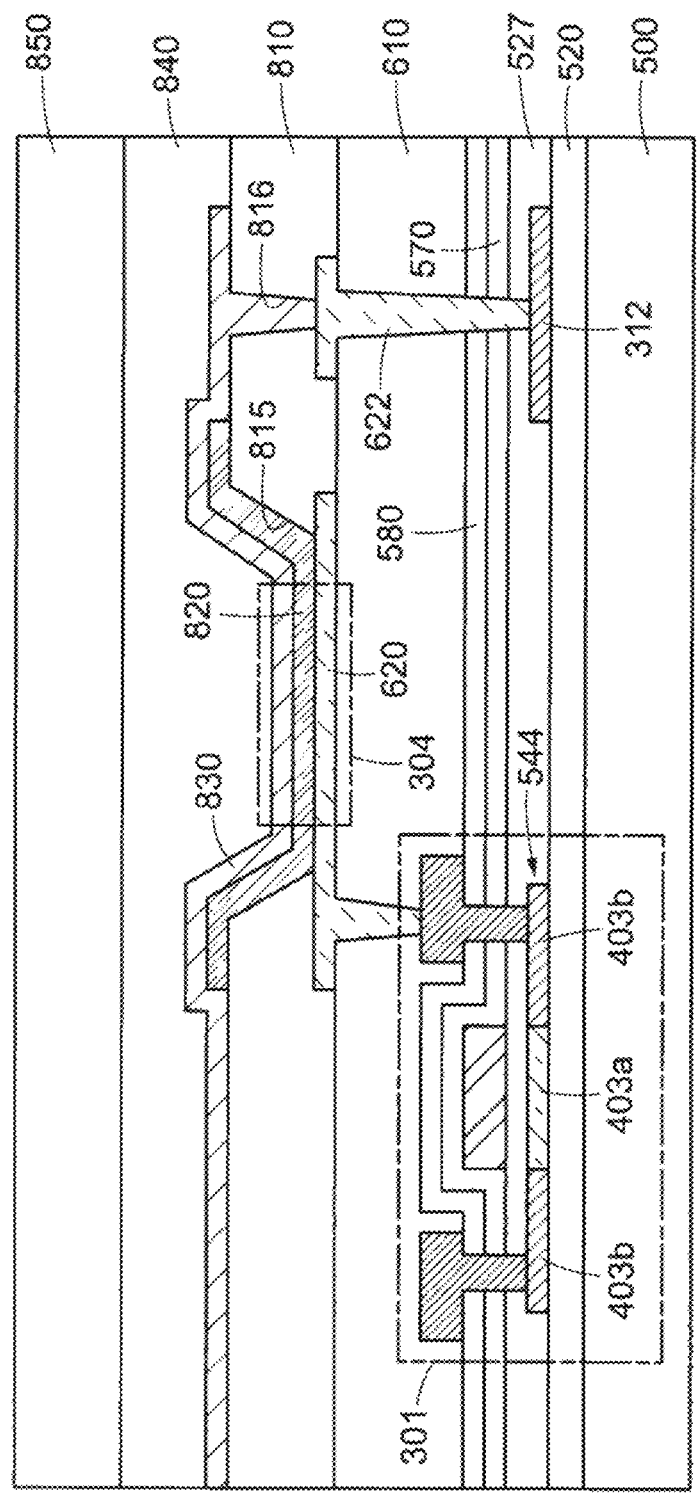
FIG. 31 is a cross-sectional view showing a structure of a pixel in a display device according to an embodiment of the present invention.

FIG. 31 is a cross-sectional view showing the structure of the pixel 112 in the display device according to an embodiment of the present invention. As shown in FIG. 31, the drive transistor 301 is arranged above the substrate 500 arranged with the base layer 520. The drive transistor 301 of the present embodiment includes the oxide semiconductor layer 544 with a polycrystalline structure. Since the basic structure of the drive transistor 301 of the present embodiment is the same as the structure of the select transistor 201 of the first embodiment, detailed explanation thereof will be omitted.

The common wiring 312 composed of the same layer as the oxide semiconductor layer 544 of the drive transistor 301 is arranged above the base layer 520. The common wiring 312 is composed of the oxide semiconductor layer having the same electric conductivity or sheet resistance as the conductive portion 403b of the oxide semiconductor layer 544.

The pixel electrode 620 that functions as an anode electrode of the light-emitting element 304 is arranged in the drive transistor 301. In the present embodiment, the pixel electrode 620 has a structure in which the transparent conductive film such as ITO and the metal layer such as silver are stacked. In the present embodiment, when the pixel electrode 620 is formed, a connection electrode 622 is formed. That is, the connection electrode 622 is configured with the same layer as the pixel electrode 620. The connection electrode 622 is connected to the common wiring 312 via a contact hole arranged in the gate insulating layer 527, the insulating layer 570, the insulating layer 580, and the planarization layer 610.

An end portion of the pixel electrode 620 is covered with a resin layer 810 called a bank or rib. An opening 815 arranged in the resin layer 810 exposes part of a surface of the pixel electrode 620. The outline of the surface of the pixel electrode 620 exposed by the opening 815 defines a light-emitting region of the light-emitting element 304. A light-emitting layer 820 and a common electrode 830 are arranged inside the opening 815. The common electrode 830 functions as a cathode of the light-emitting element 304 and is arranged across the plurality of pixels 112. On the other hand, the pixel electrode 620 and the light-emitting layer 820 are arranged separately for each pixel 112. A material that differs depending on the color of the pixel is used for the light-emitting layer 820. Although only the light-emitting layer 820 is illustrated in FIG. 31, a functional layer such as a hole injection layer, a hole transport layer, an electron injection layer, and an electron transport layer may be arranged in addition to the light-emitting layer 820.

As described in FIG. 30, the common electrode 830 is connected to the common wiring 312. In the present embodiment, as shown in FIG. 31, the common electrode 830 is connected to the common wiring 312 via the connection electrode 622. A contact hole 816 for connecting the connection electrode 622 and the common electrode 830 may be formed at the same time when the opening 815 is formed in the resin layer 810.

A sealing layer 840 is arranged above the light-emitting element 304. The sealing layer 840 may be composed of a resin material or a combination of a resin material and an inorganic material. The sealing layer 840 of the present embodiment has a three-layer structure in which a resin layer is sandwiched between silicon nitride layers. A protective substrate 850 is arranged above the sealing layer 840. The protective substrate 850 is a transparent substrate such as a glass substrate, and also functions as a touch surface of the touch sensor.

The common electrode 830 of the present embodiment functions as the cathode electrode of the light-emitting element 304 in the display period, and functions as the detection electrode for extracting the detection signal of the touch sensor in the sensing period. The supply of a voltage to be applied to the common electrode 830 and the output of the detection signal from the common electrode 830 are performed via the common wiring 312. In the present embodiment, the common wiring 312 is configured with the same layer as the oxide semiconductor layer 544 functioning as an active layer of the drive transistor 301. That is, the common wiring 312 for the touch sensor may be configured with a material (the oxide semiconductor layer) having light transmittance. Therefore, according to the present embodiment, the ratio of an effective light-emitting region (a region effectively functioning as a light-emitting region) to the display portion of the display device can be improved with a simple structure.

Each of the embodiments described above as the embodiment of the present invention can be appropriately combined as long as no contradiction is caused. In addition, the addition, deletion, or design change of components, or the addition, deletion, or condition change of process as appropriate by those skilled in the art based on each embodiment are also included in the scope of the present invention as long as they are provided with the gist of the present invention.

Further, it is understood that, even if the effect is different from those provided by each of the above-described embodiments, the effect obvious from the description in the specification or easily predicted by persons ordinarily skilled in the art is apparently derived from the present invention.

What is claimed is:

1. A display device comprising:
   a plurality of pixel electrodes each connected to a semiconductor device;
   a plurality of common electrodes each disposed opposite to a part of the plurality of pixel electrodes; and
   a plurality of common wirings each connected to the plurality of common electrodes, wherein
   the semiconductor device includes a first oxide semiconductor layer,
   the first oxide semiconductor layer includes a channel portion and a conductive portion,
   at least a part of each common wiring is composed of a second oxide semiconductor layer, and
   both the conductive portion of the first oxide semiconductor layer and the second oxide semiconductor layer include the same impurities selected from argon (Ar), phosphorus (P), or Boron (B).

2. The display device according to claim 1, wherein each common electrode is located across the plurality of pixel electrodes.

3. The display device according to claim 1, wherein the common electrode and the pixel electrode overlap via an insulating layer, and
   a liquid crystal layer is disposed above the pixel electrode and the common electrode.

4. The display device according to claim 3, wherein the pixel electrode or the common electrode has a comb-like pattern shape.

5. The display device according to claim 1, wherein a light-emitting layer is disposed above the pixel electrode, and
   the common electrode is disposed above the light-emitting layer.

6. The display device according to claim 1, wherein each common electrode is configured as a detection electrode of a touch sensor.

7. The display device according to claim 1, wherein the semiconductor device is a thin-film transistor including a channel portion and a conductive portion composed of the oxide semiconductor layer, and
   at least a part of each common wiring is composed of the same layer as the conductive portion.

8. The display device according to claim 7, wherein the thin-film transistor is a top-gate or dual-gate structure transistor.

9. The display device according to claim 8, wherein the conductive portion does not overlap the top gate of the thin-film transistor.

10. The display device according to claim 7, wherein a sheet resistance of the conductive portion is less than 500 Ω/square.

* * * * *